US009079342B2

(12) United States Patent
Sakamoto et al.

(10) Patent No.: US 9,079,342 B2
(45) Date of Patent: Jul. 14, 2015

(54) EXPANDABLE POLYSTYRENE RESIN PARTICLES AND METHOD FOR PRODUCING THE SAME

(75) Inventors: Koji Sakamoto, Koka (JP); Kazumi Yamada, Koka (JP); Ryosuke Chinomi, Koga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 387 days.

(21) Appl. No.: 13/257,300

(22) PCT Filed: Mar. 29, 2010

(86) PCT No.: PCT/JP2010/055568
§ 371 (c)(1),
(2), (4) Date: Sep. 17, 2011

(87) PCT Pub. No.: WO2010/113874
PCT Pub. Date: Oct. 7, 2010

(65) Prior Publication Data
US 2012/0022175 A1 Jan. 26, 2012

(30) Foreign Application Priority Data

| Mar. 30, 2009 | (JP) | 2009-083129 |
| Mar. 30, 2009 | (JP) | 2009-083158 |
| Mar. 30, 2009 | (JP) | 2009-083165 |
| Mar. 30, 2009 | (JP) | 2009-083168 |
| Jul. 9, 2009 | (JP) | 2009-162695 |
| Jul. 9, 2009 | (JP) | 2009-162700 |
| Jul. 9, 2009 | (JP) | 2009-162704 |
| Jul. 9, 2009 | (JP) | 2009-162707 |
| Jul. 9, 2009 | (JP) | 2009-162716 |
| Jul. 9, 2009 | (JP) | 2009-162725 |

(51) Int. Cl.
| *C08J 9/18* | (2006.01) |
| *B29C 44/34* | (2006.01) |
| *C08J 9/00* | (2006.01) |
| *C08J 9/224* | (2006.01) |
| *C08J 9/232* | (2006.01) |
| *C08J 9/16* | (2006.01) |
| C08K 3/36 | (2006.01) |
| C08K 5/02 | (2006.01) |

(52) U.S. Cl.
CPC .......... *B29C 44/3461* (2013.01); *C08J 9/0019* (2013.01); *C08J 9/0066* (2013.01); *C08J 9/16* (2013.01); *C08J 9/18* (2013.01); *C08J 9/224* (2013.01); *C08J 9/232* (2013.01); *C08J 2325/06* (2013.01); *C08K 3/36* (2013.01); *C08K 5/02* (2013.01); *F24F 2221/30* (2013.01)

(58) Field of Classification Search
CPC .......... C08J 9/0019; C08J 9/0066; C08J 9/16; C08J 9/18; C08J 9/224; C08J 9/232; C08J 2325/04; C08J 2325/06; C08K 3/36; C08K 5/02

USPC ............... 521/56, 58, 83, 91, 98, 146
See application file for complete search history.

(56) References Cited

FOREIGN PATENT DOCUMENTS

| JP | 53056899 A | * 5/1978 |
| JP | 4-351646 A | 12/1992 |
| JP | 7-243705 A | 9/1995 |
| JP | 11-106548 A | 4/1999 |
| JP | 2002-194130 A | 7/2002 |
| JP | 4035979 B2 | 7/2002 |
| JP | 2003-64211 A | 3/2003 |
| JP | 2003-64212 A | 3/2003 |
| JP | 2003-335891 A | 11/2003 |
| JP | 2004-217875 A | 8/2004 |
| JP | 2004-224977 A | 8/2004 |
| JP | 2004-278010 A | 10/2004 |
| JP | 2005-226965 A | 8/2005 |
| JP | 2007-191518 A | 8/2007 |
| JP | 2007-246606 A | 9/2007 |
| JP | 2008-75051 A | 4/2008 |
| JP | 2008-163118 A | 7/2008 |
| JP | 2008-163119 A | 7/2008 |
| TW | 589338 B | 6/2004 |

OTHER PUBLICATIONS

JP 53056899 A English Abstract May 1978.*
International Search Report for the Application No. PCT/JP2010/055568 mailed Apr. 27, 2010.
Korean Office Action for Application No. 10-2011-7017868 dated May 16, 2013.
Taiwanese Office Action for the Application No. 099109345 dated May 7, 2013.
Supplementary European Search Report for the Application No. EP 10 75 8645 dated Jun. 2, 2014.

* cited by examiner

*Primary Examiner* — Irina S Zemel
(74) *Attorney, Agent, or Firm* — Cheng Law Group, PLLC

(57) ABSTRACT

A blowing agent is infiltrated into polystyrene resin particles dispersed in an aqueous suspension. Before or during infiltration, a flame retardant solution obtained by dissolving 33-1,000 parts by weight of a powdery flame retardant and 20-200 parts by weight of a flame retardant aid having a 1-hour half-life temperature of 100-250° C. in 100 parts by weight of a plasticizer is supplied to the aqueous suspension to infiltrate the flame retardant and the flame retardant aid into the particles, producing expandable polystyrene resin particles. By dissolving the flame retardant, which doesn't accumulate in the living body and has satisfactory handleability, in a plasticizer, the flame retardant can be evenly infiltrated into resin particles. Consequently, expansion of the expandable particles doesn't result in unevenness of cell density and the particles have excellent heat-fusibility to one another during molding, and molded foam having excellent flame retardancy and heat resistance can be obtained.

17 Claims, No Drawings

EXPANDABLE POLYSTYRENE RESIN PARTICLES AND METHOD FOR PRODUCING THE SAME

TECHNICAL FIELD

The present invention relates to expandable resin particles having excellent expandability, further having excellent flame retardancy and heat-insulating property, which are used for a heat-insulating material for construction such as a roof insulating material or the like, a heat-insulating material for a hot-water storage tank of a water heater, and the like and a method for producing the same.

BACKGROUND ART

Conventionally, expandable polystyrene resin particles have been widely used as expandable resin particles. Due to preferable workability and heat-insulating property, the expandable polystyrene resin particles have been used for a heat reserving material for plumbing, a heat-insulating material for roofs, a member for automobiles, a heat reserving material for solar system and the like. In particular, a polystyrene molded foam used for a heat reserving material for a hot-water storage tank of a water heater is used as the expandable polystyrene resin particles which contain a flame retardant in order to promote high efficiency of equipments by reducing a heat radiation loss from the hot-water storage tank and achieve a certain criterion of heat-insulating property and further flame retardant property.

As a method for imparting flame retardancy to the above expandable polystyrene resin particles, there have been adopted a method for adding a flame retardant together with styrene-based monomer during polymerization, a method for adding a flame retardant in impregnating polystyrene resin particles with a blowing agent and the like. As the former method, there are methods as described in JP 2003-335891 A (Patent Literature 1) and JP 2002-194130 A (Patent Literature 2) and as the latter method, a method as described in JP 2007-246606 A (Patent Literature 3).

CITATION LIST

Patent Literature

[Patent Literature 1] Japanese Unexamined Patent Application Publication No. 2003-335891
[Patent Literature 2] Japanese Unexamined Patent Application Publication No. 2002-194130
[Patent Literature 3] Japanese Unexamined Patent Application Publication No. 2007-246606

In particular, conventionally, there has been such a demand for a roof insulating material that it has water-proof property, moisture absorption resistance, moisture-proof property, heat-insulating property and the like. In addition, it has also been demanded to prevent deterioration by heat with repeated high temperature from direct sunlight or the like (heat resistance), to prevent water leakage from a pore with a nails or staple driven, and to prevent expansion or contraction due to temperature change (dimensional stability).

With regard to the heat-insulating material used for a roof insulating material, required strength is necessary because workers are likely to walk on the material during the construction process. In addition, the heat-insulating material is preferred to be lightweight to the utmost from the viewpoint of safety and simplicity of operations on roof shingles. As the heat-insulating material, there has been often used styrene resin molded foam having a thickness of about 10 to 200 mm.

[Patent Literature 4] Japanese Unexamined Patent Application Publication No. 04-351646
[Patent Literature 5] Japanese Unexamined Patent Application Publication No. 2007-191518

In order to improve heat insulation property in houses and the like, there has been known a heat-insulating construction method for placing a heat-insulating material between floor joists in a floor or between support members such as pillars, intermediate pillars in a wall or the like. As the heat-insulating material used in such a heat-insulating construction method, glass wool has been widely generally used conventionally. However, the glass wool is likely to reduce the heat-insulating effect due to moisture absorption. Therefore, high heat-insulating effect can not be expected over a long period, and there has been also a problem in workability. For this reason, this kind of heat-insulating materials are being replaced by expandable polystyrene resin particles which are excellent in dimensional stability, heat-insulating property in recent years.

As an underfloor heat-insulating material, there has been demanded water-proof property, moisture absorption resistance, moisture-proof property, heat-insulating properties and the like. In addition, it has been also demanded to prevent expansion or construction due to temperature change (dimensional stability).

Furthermore, in such a field, there has been a demand to reduce emission amount of easily volatile organic compounds such as formaldehyde, toluene, xylene, styrene and the like for measures against sick building syndrome which is recently increasing.

[Patent Literature 6] Japanese Unexamined Patent Application Publication No. 2003-64212

For example, conventionally, a heat pump type water heater has realized hot-water supply function by storing hot water of high temperature and also supplying the stored hot water into a hot water supply terminal. However, the hot water of high temperature is stored in a hot water storage tank and at the same time, heat is released to the outside from the hot water of high temperature inside the hot water storage tank. Therefore, heat-insulating materials such as glass wool, foam heat insulating materials, a vacuum heat-insulating material, a sheet-like heat-insulating material and the like are wrapped around a hot water storage can itself by a machine or manpower in order to prevent a shortage of hot water or improve operational efficiency of the equipment (for example, see Patent Literature 1 and Patent Literature 2).

[Patent Literature 7] Japanese Unexamined Patent Application Publication No. 07-243705
[Patent Literature 8] Japanese Unexamined Patent Application Publication No. 2005-226965
[Patent Literature 9] Japanese Unexamined Patent Application Publication No. 2007-191518

Conventionally, for example, synthetic resin products have been widely used as interior materials in various vehicles such as automobiles and the like. There have been used non-expanded synthetic resin products as the interior materials for vehicles. However, expanded synthetic resin moldings have been more often used as the interior materials for vehicles with views to enhance shock-absorbing properties to improve ride quality, absorb a shock to prevent passengers, secure the flatness in a vehicle and the like. As an expandable synthetic resin, various resins such as expandable urethane, expandable polystyrene and the like are used, but the expandable polystyrene resin is more often used because of excellent moldability and functionality. Interior materials for automobiles have been strongly demanded to extremely reduce the content of volatile organic materials in a car in recent years. Examples of the volatile organic material (as disclosed in Japanese Unexamined Patent Application Publication No. 11-106548) include aromatic organic compounds such as styrene monomer(s), toluene, ethylbenzene, xylene and the like; cyclic aliphatic hydrocarbons such as aliphatic hydrocarbon having up to 16 carbons (with a boiling point under atmospheric pressure of 287° C.), cyclohexane, methylcyclohexane and the like; ester acetates such as methyl acetate, butyl acetate and the like.

[Patent Literature 11] Japanese Unexamined Patent Application Publication No. 11-106548

[Patent Literature 12] Japanese Unexamined Patent Application Publication No. 2003-64212

Conventionally, for example, embankment using expanded synthetic resin blocks has been widely used on soft ground or inclined ground or on a miniature hill of a garden, further in filling and backfilling of underground structures, and the like. Polystyrene foams are often used as such members from the point of view of strength and water resistance and in particular, the molded foam composed of particles obtained by an in-mold foaming method is generally used. In recent years, it is necessary to supply flame-retardant molded foam, and the molded foam has been much-needed to have excellent flame retardancy.

As a method for imparting flame retardancy to the expandable polystyrene resin particles, there is a method for adding a flame retardant together with styrene-based monomer during polymerization. As a method for adding a flame retardant in impregnating polystyrene resin particles with a blowing agent, there are methods as disclosed in JP 2003-335891 A (Patent Literature 13), JP 2002-194130 A (Patent Literature 14) and JP 4035979 B (Patent Literature 15).

[Patent Literature 13] Unexamined Japanese Patent Laid-Open Publication No. 2003-335891

[Patent Literature 14] Unexamined Japanese Patent Laid-Open Publication No. 2002-194130

[Patent Literature 15] Japanese Granted Patent Publication No. 4035979

DISCLOSURE OF THE INVENTION

Problems to be Solved by the Invention

However, in the method as disclosed in Patent Literature 1 or Patent Literature 2, the powdery flame retardant is non-uniformly dispersed in suspension by secondary aggregation of the flame retardant in the suspension, resulting in non-uniform absorption of the powdery flame retardant into resin particles, whereby causing such a problem that a part of the resin particles absorb a lot of the flame retardant.

Furthermore, in the method as disclosed in Patent Literature 3, hexabromocyclododecane (HBCD) is mainly used as the flame retardant. The HBCD is a material of concern about bioaccumulative potential and therefore, the elimination of its use has been expected.

In the method as disclosed in Patent Literature 3, tetrabromocyclooctane (TBCO) is mainly used, but in a simple substance of TBCO, there has been a problem such that blocking occurs between the TBCO and it is condensed depending on a state of preservation. Because of the condensed TBCO, the flame retardant is non-uniformly dispersed, resulting in non-uniform absorption of the powdery flame retardant into resin particles, thereby causing such a problem that a part of the resin particles absorb a lot of the flame retardant. Additionally, because of the condensed flame retardant, there has been a problem such that the handling property during the production process is poor.

Furthermore, by adding the powdery flame retardant, polystyrene resin particles and the flame retardant of tetrabromocyclooctane are aggregated in a reactor and aggregations are generated at a bottom portion of the reactor, thereby causing such a problem that the flame retardant is not uniformly absorbed into the polystyrene resin particles.

In addition, the absorption of the powdery flame retardant to the polystyrene resin particles becomes non-uniform and by the presence of the particles containing a lot of the flame retardant, a part of cells formed in pre-expanded particles are refined. As a result, this has caused adverse effects on the appearance of molded foam. Furthermore, by the refined of a part of cells of the molded foam, adverse effects have been caused on heat-insulating properties.

In the case of a roof structure, roofing materials exposed to direct sunlight in summer time may reach a high temperature of around 80° C. and a polystyrene molded foam which is disposed as a heat-insulating material is also likely to reach up to around 80° C. When the commonly-used styrene resin molded foam is used and left in a high-temperature environment of about 80° C. for a long time, the dimensional change rate may be about −1.5% or more than that. Due to the dimensional change, displacement could occur in a half-lap joint between resin molded foams forming a heat-insulating layer, thereby generating a gap on the joint end surface thereof. When the gap is generated, rainwater infiltrates from there to form a rainwater retention area between the resin molded foam forming the heat-insulating layer as described above and a waterproof layer, which causes breakage of the heat-insulating material. On the other hand, there has been suggestion for expandable styrene resin particles in which carbon gas is used as a blowing agent instead of an organic compound such as butane, pentane or the like (Patent Literature 4). These particles are heated to form pre-expanded particles and the pre-expanded particles are expanded in a mold, thereby obtaining moldings. Such moldings have a low amount of residual gas because the carbon gas is used as a blowing agent. Even when the moldings are left in a high temperature environment of about 80° C. for a long time, the dimensional change rate can be reduced to about −0.8%. However, when the dimensional change rate is −0.8%, the rainwater infiltration caused by shrinkage of the heat-insulting material and the breakage of the heat-insulating material can not be completely avoided.

In Patent Literature 5, a suspension polymerization method is described as a method for producing expandable polystyrene resin particles. However, in the suspension polymerization method for producing expandable polystyrene resin particles, the obtained expandable polystyrene resin particles have a broad particle size distribution and therefore, there has been a problem such that filling property of pre-expanded particles into fine part(s) of a mold is poor in molding, which results in poor moldability.

As expandable polystyrene resin particles used as under-floor heat-insulating materials for buildings such as a house and the like, the particles in Patent Literature 6 has been disclosed. However, in Patent Literature 6, a suspension polymerization method is described as a specific method for producing expandable polystyrene resin particles and hexabromocyclododecane is present during all the polymerization process of styrene. The hexabromocyclododecane has been expected not to be used and also known to inhibit polymerization of styrene monomer(s). As a result, many remaining easily volatile organic compounds are contained in the obtained expandable polystyrene resin particles, there has been a problem of difficulty in responding to sick building syndrome which has been requested in recent years.

On the other hand, since each part forming a top part and a bottom part of the hot water storage tank generally has a three-dimensional curved surface formed, when a vacuum heat-insulating material or a sheet-like heat-insulating material is employed over the whole surface, attachment is difficult and further, with the heat-insulating material wound and fixed, there has been a problem of poor attachment and detachment workability in doing maintenance after installing the hot water storage tank.

Furthermore, in cases of employing conventional polystyrene molded foam, it is necessary to have a thickness in order to ensure the heat insulation property. As a result, there has been a problem that a heat pump type water heater is made larger in size. Furthermore, the heat-insulating material for a hot water storage tank of a heat pump type water heater is commonly used as the heat-insulating material having a thickness of 10 to 200 mm from the viewpoint of reduction in weight and in size of a unit.

In Patent Literature 9, a suspension polymerization method is disclosed as a method for producing expandable polystyrene resin particles. In the suspension polymerization method for producing expandable polystyrene resin particles, the obtained expandable polystyrene resin particles have a broad particle size distribution. Therefore, there has been an issue such that filling property of pre-expanded particles into minute parts of a mold is poor in molding a heat-insulating material for a heat pump type water heater having three-dimensional curved surfaces, which results in poor moldability.

Furthermore, in the hot water storage tank of the heat pump type water heater, hot water having a high temperature of about 90° C. may be stored for a long time and the polystyrene molded foam disposed as the heat-insulating material is also likely to reach up to approximately 90° C. In the commonly-used polystyrene resin molded foam, the dimensional change rate (heat deformation accompanied by shrinkage) when left for a long time in a high-temperature environment of approximately 80° C. may be approximately −1.5% or more than that. Due to the dimensional change, displacement could occur in a half-lap joint between resin molded foams forming a heat-insulating layer, thereby generating a gap on the joint end surface thereof. If the gap is generated by shrinkage of the foam, the heat retention performance of the hot water storage tank itself is functionally deteriorated.

Any of organic compounds in the molded foam have effects to enhance expansion capacities and fusibility of expandable polystyrene resin particles. However, if these contents are reduced, there are problems of not only deterioration in the expandability and difficulty in lowering the density but also deterioration in the fusibility of a molding and reduction in the mechanical strength. Moreover, expandable polystyrene resin particles used in an automobile member is also required to have a certain criterion of flame retardant property and in Patent Literature 11, a suspension polymerization method is described as a specific method for producing expandable polystyrene resin particles. However, hexabromocyclododecane has been expected not to be used from the viewpoint of bioaccumulative potential and the like.

On the other hand, in the above method, the powdery flame retardant is non-uniformly dispersed in suspension by causing secondary aggregation of the flame retardant in the suspension, resulting in non-uniform absorption of the powdery flame retardant to resin particles, whereby there has been caused such a problem that a part of the resin particles absorb a lot of the flame retardant.

In addition, hexabromocyclododecane (HBCD) is used as the flame retardant used for expandable polystyrene resin particles. HBCD is a material of concern about bioaccumulative potential and the elimination of its use has been expected.

Means for Solving the Problems

The present inventors have reached the invention by finding that there can be provided expandable polystyrene resin particles such that a flame retardant having no bioaccumulative potential and having a good handling property in the production process is dissolved in a plasticizer, whereby the flame retardant can be evenly impregnated into the resin particles, unevenness of cell density is not caused upon expanding and the heat fusibility between the particles is excellent during the molding, and that molded foam having excellent flame retardancy and heat-insulating property can be obtained using the particles.

The present invention relates to expandable polystyrene resin particles, which are obtained by supplying a flame-retardant solution into an aqueous suspension before or during impregnating polystyrene resin particles dispersed in the above aqueous suspension with a blowing agent, in which the flame-retardant solution is prepared by dissolving in a plasticizer 33 to 1000 parts by weight of a powdery flame retardant relative to 100 parts by weight of the plasticizer and further 20 to 200 parts by weight of a flame retardant aid having one-hour half-life temperature of 100° C. to 250° C. relative to 100 parts by weight of the plasticizer, and impregnating the above polystyrene resin particles with the flame retardant and the flame retardant aid.

The present invention relates to a method for producing expandable polystyrene resin particles comprising steps of: before or during impregnating polystyrene resin particles dispersed in an aqueous suspension with a blowing agent, supplying a flame-retardant solution into the above aqueous suspension, in which the flame-retardant solution is prepared by dissolving 33 to 1000 parts by weight of powdery flame retardant relative to 100 parts by weight of a plasticizer and further 20 to 200 parts by weight of a flame retardant aid having one-hour half-life temperature of 100° C. to 250° C. relative to 100 parts by weight of the plasticizer and impregnating the above polystyrene resin particles with the flame retardant and the flame retardant aid, wherein the above flame retardant contains 98.5 to 99.7 parts by weight of tetrabromocyclooctane and 0.3 to 1.5 parts by weight of silica fine powders.

Particularly, for example, according to the present invention, expandable polystyrene resin particles for a heat-insulating material, which are used for a roof insulating material, is obtained by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during impregnating the particles with a blowing agent, wherein the flame-retardant solution is prepared by dissolving 33 to 1000 parts by weight of powdery flame retardant comprising tetrabromocyclooctane relative to 100 parts by weight of a plasticizer and further 20 to 200 parts by weight of a flame retardant aid having one-hour half-life temperature of 100° C. to 250° C. relative to 100 parts by weight of the plasticizer, and impregnating the above polystyrene resin particles with the flame retardant and the flame retardant aid. Then, pre-expanded particles obtained by pre-expanding the expandable polystyrene resin particles are filled into a mold and expanded, thereby obtaining a molded foam whose average chord length is 30 to 380 µm.

Especially, a heat-insulating roof structure according to the present invention, that is, a heat-insulating material for a roof insulating material is a polystyrene molded foam placed between a base material such as a roofing board or the like and a roofing material, wherein the polystyrene molded foam has the dimensional change rates before and after heating is within ±0.5% when heated at 90° C. for 168 hours. Also, the heat-insulating material for a roof insulating material is the polystyrene molded foam having the density ranging from 0.018 to 0.033 g/cm$^2$ and the average chord length of the foam is 30 µm to 380 µm. Furthermore, with regard to the heat-insulating material for a roof insulating material having the dimensional change rate in the above range, that is, the polystyrene molded foam is prepared by pre-expanding and molding expandable polystyrene resin particles having the average particle diameter of 0.3 mm to 1.2 mm and having a coefficient of variation (CV value) of the polystyrene resin particle diameter ranging from 5 to 15%.

In addition, particularly, for example, according to the present invention, expandable polystyrene resin particles for a heat-insulating material, which are used under floors of houses, is obtained by dispersing polystyrene resin particles in an aqueous suspension, followed by supplying a flame-retardant solution into the above aqueous suspension before or during impregnating the particles with a blowing agent, wherein the flame-retardant solution is prepared by dissolving in a plasticizer 33 to 1000 parts by weight of powdery flame retardant comprising tetrabromocyclooctane relative to 100 parts by weight of the plasticizer having the solubility parameter (SP value) of not less than 8.3 to not greater than 9.4 and further 20 to 200 parts by weight of a flame retardant aid having one-hour half-life temperature of 100° C. to 250° C. relative to 100 parts by weight of the plasticizer having the SP value of not less than 8.3 but not more than 9.4, and impregnating the above polystyrene resin particles with the flame retardant and the flame retardant aid. Then, pre-expanded particles obtained by pre-expanding expandable polystyrene resin particles for a heat-insulating material is filled into a mold and expanded, thereby obtaining a molded foam in which the average chord length is 20 to 150 µm.

Especially, the underfloor heat-insulating material according to the present invention is the polystyrene molded foam placed between floor joists in a floor or between support members such as pillars, intermediate pillars and others in a wall and the density of the polystyrene molded foam of the present invention is 0.020 to 0.028 g/cm$^3$ and the average chord length of the foam is 20 to 150 µm.

In the polystyrene foam used for the underfloor heat-insulating material of the present invention, there are used, for example, an organic compound having the SP value of not less than 8.3 but not greater than 9.4, such as adipic acid esters as a plasticizer. As a result, the polystyrene foam in which the total amount of one or more kinds of aromatic organic compounds selected from a group consisting of styrene monomer(s), ethyl benzene, isopropyl benzene, normal propyl benzene, xylene and toluene is less than 1000 ppm relative to the total amount of the polystyrene foam is prepared.

Furthermore, the polystyrene molded foam having a dimensional change rate in the above range is prepared by pre-expanding and molding expandable polystyrene resin particles having the average particle diameter of 0.6 mm to 1.2 mm.

Particularly, for example, according to the present invention, in order to provide a heat-insulating material for a hot water storage tank of a heat pump type water heater, which is compact and has a flame retardancy without impairing heat insulation property, expandable polystyrene resin particles for a heat-insulating material, which are used for a hot water storage tank of a heat pump type water heater, are obtained by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during impregnating the particles with a blowing agent, wherein the flame-retardant solution is prepared by dissolving 33 to 1000 parts by weight of powdery flame retardant comprising tetrabromocyclooctane relative to 100 parts by weight of a plasticizer and further 20 to 200 parts by weight of a flame retardant aid having one-hour half-life temperature of 100° C. to 250° C. relative to 100 parts by weight of the plasticizer, and impregnating the above polystyrene resin particles with the above flame retardant and the flame retardant aid. Then, pre-expanded particles obtained by pre-expanding expandable polystyrene resin particles are filled into a mold and expanded, thereby obtaining a molded foam whose average chord length is 150 to 330 µm.

Especially, this heat-insulating material for a hot water storage tank of a heat pump type water heater, that is, the polystyrene molded foam according to the present invention is a heat-insulating material used between the hot water storage tank of the heat pump type water heater and the substantially rectangular parallelepiped exterior case storing a hot water storage tank therein, wherein the polystyrene molded foam has the dimensional change rate before and after heating of within ±0.5% when heated at 90° C. for 168 hours.

The polystyrene molded foam also has a density of 0.016 to 0.033 g/cm$^3$ and the average chord length of the foam is 50 to 350 µm.

Furthermore, the polystyrene molded foam having the dimensional change rate in the above range is prepared by impregnating, pre-expanding and molding polystyrene resin particles having the average particle diameter of 0.3 mm to 1.2 mm and having a coefficient of variation (CV value) of the polystyrene resin particle diameter ranging from 5 to 15%.

Particularly, for example, the present invention relates to expandable polystyrene resin particles used for car interior materials is obtained by dispersing polystyrene resin particles in an aqueous suspension, followed by supplying a flame-retardant solution into the above aqueous suspension before or during impregnating the particles with a blowing agent, in which the flame-retardant solution is prepared by dissolving in a plasticizer 33 to 300 parts by weight of the powdery flame retardant comprising tetrabromocyclooctane relative to 100 parts by weight of the plasticizer having the solubility parameter (SP value) of not less than 8.3 to not greater than 9.4 and further, 20 to 200 parts by weight of a flame retardant aid having one-hour half-life temperature of 100° C. to 250° C. relative to 100 parts by weight of the plasticizer having the SP value of not less than 8.3 to not greater than 9.4, and impregnating the above polystyrene resin particles with the above flame retardant and the flame retardant aid. Then, pre-expanded particles obtained by pre-expanding expandable polystyrene resin particles are filled into a mold and expanded, thereby obtaining an molded foam whose average chord length is 40 to 150 µm.

Especially, a heat-insulating material for car interior materials according to the present invention is a polystyrene molded foam, wherein the density of the polystyrene molded foam of the present invention is 0.016 to 0.066 g/cm³ and the average chord length of the foam is 40 µm to 150 µm.

Particularly, for example, the present invention relates to expandable polystyrene resin particles used for embankment, wherein the expandable polystyrene resin particles are obtained by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during impregnating with a blowing agent, in which the flame-retardant solution is prepared by dissolving in a plasticizer 40 to 300 parts by weight of the powdery flame retardant comprising tetrabromocyclooctane relative to 100 parts by weight of the plasticizer and further, 20 to 200 parts by weight of a flame retardant aid having one-hour half-life temperature of 100° C. to 250° C. relative to 100 parts by weight of the plasticizer, and impregnating the above polystyrene resin particles with the above flame retardant and the flame retardant aid.

Then, pre-expanded particles obtained by pre-expanding expandable polystyrene resin particles used for embankment are filled into a mold and expanded, thereby obtaining a molded foam whose average chord length is 40 to 120 µm.

Especially, a member for embankment according to the present invention, that is, a polystyrene molded foam has a density of 0.01 to 0.033 g/cm³ and an average chord length of the foam is 40 µm to 120 µm. Furthermore, the polystyrene molded foam is prepared by pre-expanding and molding expandable polystyrene resin particles having the average particle diameter of 0.6 mm to 1.4 mm and having a coefficient of variation (CV value) of the polystyrene resin particle diameter ranging from 5 to 15%.

Effect of the Invention

The expandable polystyrene resin particles of the present invention are characterized in that a flame retardant and a flame retardant aid are uniformly absorbed into the expandable polystyrene resin particles.

It is noted that the flame retardant to be added comprises silica fine powders added to tetrabromocyclooctane and the addition of the silica fine powders results in improved dispersibility of the tetrabromocyclooctane. Therefore, the handling property in the production is very good and when adding the flame retardant to a plasticizer, uniform dispersion can be achieved in the plasticizer.

Furthermore, because the plasticizer is in a liquid state and uniformly dispersed in an aqueous suspension, it would appear that the flame retardant uniformly dispersed in the plasticizer is also uniformly dispersed in the aqueous suspension. Therefore, the flame retardant can be uniformly absorbed into polystyrene resin particles and sufficiently efficiently into the central portion thereof, thereby enabling to provide expandable polystyrene resin particles having good heat fusibility during molding.

Furthermore, since tetrabromocyclooctane is uniformly and stably dispersed by silica fine powders, tetrabromocyclooctane causes no secondary aggregation or settling and there occurs no such problem as blocking of a pipe line which is caused by tetrabromocyclooctane.

In addition, because all of the silica fine powders to be added to the flame retardant are flown into the discharged water during the production process, only the flame retardant is absorbed into the obtained expandable polystyrene resin particles. Because the silica fine powders are not absorbed thereinto, the flame retardancy of the foam which is obtained from the above expandable polystyrene resin particles is not lowered.

Moreover, because the powdery flame retardant is completely dissolved in the plasticizer, there occurs no such problem that the powdery flame retardant is aggregated and settled on the bottom part in a reactor during the production process of the expandable polystyrene.

Furthermore, due to the foam obtained from an expandable polystyrene resin containing no flame retardant of HBCD, there can be obtained expandable polystyrene resin particles having no bioaccumulative potential and which can be formed into the molded foam having excellent heat-insulating property and flame retardancy.

The expandable polystyrene particles of the present invention can produce a molded foam which maintains excellent expandability even if containing the flame retardant and the flame retardant aid and is excellent in heat resistance, heat-insulating property and flame retardancy. This molded foam can be developed for a wide range of uses such as a heat-insulating material for hot water storage tank of a heat pump type water heater and the like.

For example, if the present invention is used as a heat-insulating material for a roof insulating material, a roofing material which has been exposed to the direct rays of the sun in summer may reach a high temperature of 80° C. and the polystyrene molded foam of the present invention, which is installed as a heat-insulating material, is also likely to reach up to approximately 80° C. However, the polystyrene molded foam of the present invention has a dimensional change rate within ±0.5% when heated at 90° C. for 168 hours. Therefore, the polystyrene molded foam has no possibility to cause elution or deformations such as warping, expansion and the like even at the time of high temperature in summer and has excellent temperature stability, and it can be used without deterioration by heat for a long period of time even if repeatedly exposed to high temperature.

For this reason, the heat-insulating material that has caused problems in the usual heat-insulating roof structure can be prevented from being broken.

Furthermore, the molded foam has excellent heat-insulating property because the average cell diameter of the molded foam is regulated. Therefore, there is an effect of enhancing heat-insulating properties and airtightness inside a building, and as a result, it is possible to effectively maintain cooling and heating effects in a living space.

In addition, since the above polystyrene molded foam is obtained by pre-expanding and molding expandable polystyrene resin particles having a sharp particle size in which the average particle diameter is 0.3 mm to 1.2 mm and a coefficient of variation (CV value) of the polystyrene resin particle diameter is from 5 to 15%, the particles have very good flowability and the pre-expanded particles have a good filling property into a cavity during the molding, and it is possible to form the molded foam of complicated shapes with curved surfaces, concavities and convexities or grooves.

Additionally, for example, when the present invention is used as the polystyrene foam for an underfloor heat-insulating material, it enables to eliminate the use of hexabromocyclododecane, it is excellent in flame retardancy and heat-insulating property, and excellent in preventing from being expanded or contracted by temperature change (dimensional stability). Since the content of easily volatile organic compounds such as formaldehyde, toluene, xylene, styrene and the like is lowered to less than 1000 ppm, the volatile organic compounds are small in amount and good for environmental sanitation.

Also, since adipic acid ester having for example the SP value of not less than 8.3 but not more than 9.4 is used as a plasticizer of the expandable polystyrene resin particles, the obtained molded foam has good heat fusibility and contains a small amount of the volatile organic compounds, which is good for environmental sanitation.

Furthermore, the molded foam has excellent heat-insulating property because the average cell diameter of the molded foam is regulated. Therefore, there is an effect of enhancing heat-insulating properties and airtightness inside a building and as a result, it is possible to effectively maintain cooling and heating effects in a living space.

In addition, for example, when the present invention is used as a heat-insulating material for a hot water storage tank of a heat pump type water heater, the dimensional change rate when heated at 92° C. for 168 hours is within ±0.5%. Therefore, the molded foam has no possibility to cause deformations such as warping, expansion and the like and has excellent temperature stability, and can be used without deterioration by heat for a long period of time even if repeatedly exposed to high temperature.

For this reason, the formation of clearance between the hot water storage tank and an exterior case storing the hot water storage tank therein can be reduced and deterioration in the heat retention performance of the water heater in itself can be prevented.

Furthermore, the molded foam has excellent heat-insulating property because the average cell diameter of the molded foam is regulated. Therefore, the heat retention performance of the hot water storage tank can be enhanced.

In addition, since the above heat-insulating material for a hot water storage tank of a heat pump type water heater composed of the polystyrene molded foam is prepared by impregnating with, pre-expanding and molding expandable polystyrene resin particles having a sharp particle size in which the average particle diameter is 0.3 mm to 1.2 mm and a CV value is from 5 to 15%, the particles have very good flowability and the pre-expanded particles have a good filling property into a cavity during the molding and it is possible to form the molded foam of complicated shapes with a three-dimensional curved surface forming a top part and a bottom part of the hot water storage tank.

Additionally, for example, if the present invention is used as the polystyrene foam used for car interior materials, it can eliminate the use of hexabromocyclododecane, which is excellent in flame retardancy and heat-insulating property and excellent in preventing from being expanded or contracted by temperature change (dimensional stability). Since the content of easily volatile organic compounds such as formaldehyde, toluene, xylene, styrene and the like is lowered to less than 1000 ppm, the volatile organic compounds are small in amount and good for environmental sanitation.

Also, since adipic acid ester having for example the SP value of not less than 8.3 and not greater than 9.4 is used as a plasticizer of the expandable polystyrene resin particles, the obtained molded foam has good heat fusibility and contains a small amount of the volatile organic compounds, which is good for environmental sanitation.

For example, if the present invention is used as a embankment member, it is characterized by having excellent flame retardancy because the flame retardant and the flame retardant aid are uniformly absorbed thereinto.

It is noted that the flame retardant to be added comprises silica fine powders added to tetrabromocyclooctane and the dispersibility of tetrabromocyclooctane is remarkably improved by comprising the silica fine powders. Therefore, the handling property in the production is very good and in adding the flame retardant to a plasticizer, uniform dispersion is possible in the plasticizer. Furthermore, because the plasticizer is in a liquid state and uniformly dispersed in an aqueous suspension, it would appear that that the flame retardant uniformly dispersed in the plasticizer is also uniformly dispersed in the aqueous suspension. Therefore, the flame retardant can be uniformly absorbed into polystyrene resin particles and sufficiently efficiently into the central portion thereof, thereby enabling to provide expandable polystyrene resin particles for embankment having good heat fusibility in molding.

Moreover, the embankment member of the present invention is characterized by having no bioaccumulative potential and having excellent flame retardancy because the flame retardant of HBCD is not used during the production process.

Furthermore, since the above polystyrene molded foam is the one obtained by pre-expanding and molding expandable polystyrene resin particles having a sharp particle size in which the average particle diameter is 0.6 mm to 1.4 mm and a coefficient of variation (CV value) of the polystyrene resin particle diameter is from 5 to 15%, the particles have very good flowability and the pre-expanded particles have a good filling property into a cavity during the molding, and it is possible to form the molded foam of complicated shapes with curved surfaces, concavities and convexities or grooves.

BEST MODE FOR CARRYING OUT THE INVENTION

The expandable polystyrene resin particles of the present invention is obtained by supplying a flame-retardant solution into an aqueous suspension before or during the impregnation of a blowing agent into polystyrene resin particles dispersed in the above aqueous suspension, in which the flame-retardant solution is prepared by dissolving in a plasticizer 33 to 1000 parts by weight of powdery flame retardant relative to 100 parts by weight of the plasticizer and further 20 to 200 parts by weight of a flame retardant aid having one-hour half-life temperature of 100° C. to 250° C. relative to 100 parts by weight of the plasticizer, and impregnating the above polystyrene resin particles with the flame retardant and the flame retardant aid. In particular, the above flame retardant comprises tetrabromocyclooctane preliminarily dispersed by silica fine powders. It is characterized in that the above flame retardant contains 98.5 to 99.7 parts by weight of tetrabromocyclooctane and 0.3 to 1.5 parts by weight of silica fine powders.

Here, when the flame retardant of tetrabromocyclooctane is added in the powdery state, there has been a problem that aggregates of the flame retardant are produced on the bottom of a reactor during the production process.

Particularly, for example, in cases of the expandable polystyrene resin particles of the present invention which are used for the roof insulating material, they are prepared by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during the impregnation of a blowing agent into the particles, in which the flame-retardant solution is prepared by dissolving 33 to 1000 parts by weight of powdery flame retardant relative to 100 parts by weight of a plasticizer and further, 20 to 200 parts by weight of a flame retardant aid having one-hour half-life temperature of 100° C. to 250° C. relative to 100 parts by weight of the plasticizer, and impregnating the above polystyrene resin particles with the flame retardant and the flame retardant aid, wherein the above flame retardant contains 98.5 to 99.7 parts by weight of tetrabromocyclooctane and 0.3 to 1.5 parts by weight of silica fine powders.

In addition, for example, in cases of the expandable polystyrene resin particles of the present invention which are used for the underfloor heat-insulating material, there is a method for preparing expandable polystyrene resin particles comprising steps of supplying a flame-retardant solution into an aqueous suspension before or during the impregnation of a blowing agent into the polystyrene resin particles dispersed in the above aqueous suspension, in which the flame-retardant solution is obtained by dissolving 33 to 1000 parts by weight of powdery flame retardant relative to 100 parts by weight of a plasticizer having the SP value of not less than 8.3 but not more than 9.4 in the above plasticizer and 20 to 200 parts by weight of a flame retardant aid having one-hour half-life temperature of 100° C. to 250° C. relative to 100 parts by weight of the plasticizer having the SP value of not less than 8.3 but not more than 9.4 in the above plasticizer, and impregnating the above polystyrene resin particles with the flame retardant and the flame retardant aid, wherein the above flame retardant contains 98.5 to 99.7 parts by weight of tetrabromocyclooctane and 0.3 to 1.5 parts by weight of silica fine powders.

Furthermore, for example, in cases of the expandable polystyrene resin particles of the present invention which are used for a hot water storage tank of a heat pump type water heater, they are prepared by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during the impregnation of a blowing agent into the particles, in which the flame-retardant solution is prepared by dissolving 33 to 1000 parts by weight of powdery flame retardant relative to 100 parts by weight of a plasticizer and 20 to 200 parts by weight of a flame retardant aid having one-hour half-life temperature of 100° C. to 250° C. relative to 100 parts by weight of the plasticizer, and impregnating the above polystyrene resin particles with the flame retardant and the flame retardant aid, wherein the above flame retardant contains 98.5 to 99.7 parts by weight of tetrabromocyclooctane and 0.3 to 1.5 parts by weight of silica fine powders.

Furthermore, for example, in cases of the expandable polystyrene resin particles of the present invention which are used for car interior materials, they are prepared by dispersing polystyrene resin particles in an aqueous suspension, followed by supplying a flame-retardant solution into the above aqueous suspension before or during the impregnation of a blowing agent into the particles, the flame-retardant solution is obtained by dissolving 33 to 1000 parts by weight of powdery flame retardant comprising tetrabromocyclooctane relative to 100 parts by weight of a plasticizer having the solubility parameter (SP value) of not less than 8.3 but not more than 9.4 and further, 20 to 200 parts by weight of a flame retardant aid having one-hour half-life temperature of 100° C. to 250° C. relative to 100 parts by weight of the plasticizer having the SP value of not less than 8.3 but not more than 9.4 in the plasticizer, and impregnating the above polystyrene resin particles with the above flame retardant and the flame retardant aid, wherein the above flame retardant contains 98.5 to 99.7 parts by weight of tetrabromocyclooctane and 0.3 to 1.5 parts by weight of silica fine powders.

Furthermore, for example, in cases of the expandable polystyrene resin particles of the present invention which are used for embankment, they are obtained by dispersing polystyrene resin particles having a coefficient of variation (CV value) of the polystyrene resin particle diameter ranging from 5 to 15% in an aqueous suspension, followed by supplying a flame-retardant solution into the above aqueous suspension before or during the impregnation of a blowing agent into the particles, in which the flame-retardant solution is prepared by dissolving in a plasticizer 33 to 300 parts by weight of powdery flame retardant relative to 100 parts by weight of the plasticizer and 20 to 200 parts by weight of a flame retardant aid having one-hour half-life temperature of 100° C. to 250° C. relative to 100 parts by weight of the plasticizer, and impregnating the above polystyrene resin particles with the above flame retardant and the flame retardant aid, wherein the above flame retardant contains 98.5 to 99.7 parts by weight of tetrabromocyclooctane and 0.3 to 1.5 parts by weight of silica fine powders.

The polystyrene resin particles in the present invention can be produced by a known method. Examples of the known method include (1) a suspension polymerization method in which polystyrene resin particles are prepared by supplying an aqueous medium, styrene-based monomer and a polymerization initiator into an autoclave and conducting the suspension polymerization of the styrene-based monomer while being heated and stirred in the autoclave, (2) a seed polymerization method in which polystyrene resin particles are prepared by supplying an aqueous medium and polystyrene resin seed particles into an autoclave and dispersing the polystyrene resin seed particles in the aqueous medium, followed by continuously or intermittently supplying with styrene-based monomer while being heated and stirred in the autoclave and conducting a polymerization in the presence of the polymerization initiator while letting the polystyrene resin seed particles to absorb the styrene-based monomer, and the like. It is noted that the polystyrene resin seed particles may be prepared by the above suspension polymerization method (1) and then classified.

Here, examples of the polystyrene resin of the present invention include a homopolymer of styrene-based monomer(s) such as styrene, α-methyl styrene, vinyl toluene, chlorostyrene, ethyl styrene, isopropyl styrene, dimethyl styrene, bromostyrene and the like or a copolymer of these and the like.

Furthermore, the above polystyrene resin may be a copolymer of the above styrene-based monomer(s) with a vinyl monomer copolymerizable with this styrene-based monomer(s), in which the above styrene-based monomer(s) is main component. Examples of such a vinyl monomer include alkyl(meth)acrylate such as methyl(meth)acrylate, ethyl(meth)acrylate, butyl(meth)acrylate, cetyl(meth)acrylate or the like, (meth) acrylonitrile, dimethyl maleate, dimethyl fumarate, diethyl fumarate, ethyl fumarate as well as a bifunctional monomer such as divinylbenzene, alkylene glycol dimethacrylate or the like.

If an in-mold expansion molding is carried out by using the expandable polystyrene resin particles, the average particle diameter of the polystyrene resin particles is preferably 0.3 to 2.0 mm, more preferably 0.6 to 1.4 mm from the perspective of the filling property of pre-expanded particles obtained by pre-expanding the expandable polystyrene resin particles into a cavity. When the average particle diameter of the particles exceeds 2.0 mm, the filling property of the pre-expanded particles into a cavity is deteriorated, so that filling failure occurs and the expanded particles can not be filled into fine part(s) of the mold, whereby there has been a problem of failing to obtain a molded foam. On the other hand, when the average particle diameter of the particles is less than 0.3 mm, the strength of the molded foam becomes insufficient, whereby there have been problems of cracking the molded foam during construction and the like.

In particular, when the present invention is applied to the heat-insulating material used for a roof insulating material, the average particle diameter of the polystyrene resin particles is preferably 0.3 to 1.2 mm. It is noted that the coefficient of variation (CV value) of the polystyrene resin particle diameter of the present invention is preferably 5 to 15%, more preferably 5.5 to 12%, further preferably 6 to 9%. When the CV value exceeds 20%, the filling property of the pre-expanded polystyrene resin particles into a cavity is deteriorated, so that the expanded particles can not be filled into fine part(s) of the mold, whereby there has been a problem of failing to obtain a foam. When the CV value falls below 3%, many processes are required in the production, so that production cost is increased. Therefore, this is not preferable.

Additionally, when the present invention is applied to the heat-insulating material used for an underfloor heat-insulating material, the average particle diameter of the polystyrene resin particles is preferably 0.6 to 1.2 mm.

Furthermore, when the present invention is used for a heat-insulating material for a hot water storage tank of a heat pump type water heater, the average particle diameter of the polystyrene resin particles is 0.3 to 2.0 mm, preferably 0.5 to 1.0 mm. When the average particle diameter of the particles exceeds 2.0 mm, the filling property of the pre-expanded particles into a cavity is deteriorated, so that filling failure occurs and the expanded particles can not be filled into fine part(s) of a mold, whereby there has been a problem of failing to obtain a molded foam. On the other hand, when the average particle diameter of the particles is less than 0.3 mm, gas in the polystyrene resin particles is dissipated quickly, resulting in a problem of failing to expand the particles to the desired high density during pre-expanding. In particular, the coefficient of variation (CV value) of the polystyrene resin particle diameter of the present invention is preferably 5 to 15%, more preferably 6 to 12%, further preferably 7 to 9%. When the CV value exceeds 20%, the filling property of the pre-expanded polystyrene resin particles into a cavity is deteriorated, so that the expanded particles can not be filled into fine part(s) of a mold, whereby there has been a problem of failing to obtain a foam. When the CV value falls below 3%, many processes are required in the production, so that production cost is increased and therefore, this is not preferable.

Furthermore, when the present invention is used for a car interior material, the average particle diameter of the polystyrene resin particles is preferably 0.6 to 1.2 mm.

Furthermore, when the present invention is used for a embankment member, the average particle diameter of the polystyrene resin particles is preferably 0.6 to 1.4 mm. In particular, the coefficient of variation (CV value) of the polystyrene resin particle diameter of the present invention is preferably 5 to 15%, more preferably 5.5 to 12%, further preferably 6 to 9%. When the CV value exceeds 20%, the filling property of the pre-expanded polystyrene resin particles into a cavity is deteriorated, so that the expanded particles can not be filled into fine part(s) of a mold, whereby there has been a problem of failing to obtain a foam. When the CV value falls below 3%, many processes are required in the production, so that production cost is increased and therefore, this is not preferable.

Further, when styrene-equivalent weight average molecular weight of the polystyrene resin constituting the polystyrene resin particles is smaller, the mechanical strength of the polystyrene resin molded foam obtained by expanding the expandable polystyrene resin particles may be lowered. On the other hand, when the styrene-equivalent weight average molecular weight is larger, the expandability of the expandable polystyrene resin particles may be lowered, thereby providing the possibility of failing to obtain the polystyrene resin molded foam having a high expansion ratio. Therefore, the styrene-equivalent weight average molecular weight is preferably 150,000 to 500,000 and more preferably 200,000 to 400,000.

The polymerization initiator used in the above suspension polymerization method and seed polymerization method is not particularly limited. Examples of the polymerization initiator include organic peroxides such as benzoyl peroxide, lauryl peroxide, t-butyl peroxybenzoate, di-t-butyl peroxide, t-butyl peroxypivalate, t-butyl peroxyisopropyl carbonate, t-butyl peroxy-2-ethylhexyl monocarbonate, t-butyl peroxy-2-ethyl hexanoate, t-butyl peroxyacetate, 2,2-bis(t-butyl peroxy)butane, t-butyl peroxy-3,3,5 trimethyl hexanoate, di-t-butyl peroxyhexahydro terephthalate, 2,5-Dimethyl-2,5-bis (benzoylperoxy)hexane, dicumyl peroxide and the like, azo compounds such as azobisisobutyronitrile, azobis dimethyl valero nitrile and the like, and the like. These may be used alone or used in combination of two or more kinds.

As an aqueous suspension prepared by dispersing the polystyrene resin particles in an aqueous medium, a reaction solution after polymerization conducted by the suspension polymerization method or the seed polymerization method may be used, or the aqueous suspension may be formed by separating the polystyrene resin particles obtained by the above suspension polymerization method or the seed polymerization method from a reaction solution and suspending these polystyrene resin particles in an aqueous medium prepared separately. It is noted that the aqueous medium is not particularly limited, examples thereof include water, alcohol and the like, and water is preferable.

In addition, in the suspension polymerization method or the seed polymerization method, when the styrene-based monomer is polymerized, a suspension stabilizer may be used in order to stabilize the dispersibility of droplets of the styrene-based monomer or the polystyrene resin seed particles. Examples of such a suspension stabilizer include water-soluble polymers such as polyvinyl alcohol, methyl cellulose, polyacrylamide, polyvinyl pyrrolidone and the like or poor water-soluble inorganic salts such as tribasic calcium phosphate, magnesium pyrophosphate and the like. When the poor water-soluble inorganic salts are used, an anion surfactant is generally used together.

Examples of the anion surfactant include alkyl sulfates such as sodium lauryl sulfate and the like, alkylbenzene sulfonates such as sodium dodecylbenzene sulfonate and the like, higher fatty acid salts such as sodium oleate and the like, β-tetrahydroxynaphthalene sulfonate and the like, and the alkylbenzene sulfonates are preferable.

In the method for preparing the expandable polystyrene resin particles of the present invention, a blowing agent is impregnated in the known method into the polystyrene resin particles dispersed in the above aqueous suspension. As such a blowing agent, an organic compound in a gas or liquid state at ordinary pressure whose boiling point is not more than the softening point of the polystyrene resin is suitable. Examples of the blowing agent include carbon hydrides such as propane, n-butane, iso-butane, n-pentane, iso-pentane, neopentane, cyclopentane, cyclopentadiene, n-hexane, petroleum ether and the like, ketones such as acetone, methyl ethyl ketone and the like, alcohols such as methanol, ethanol, isopropyl alcohol and the like, ether compounds having a low boiling point such as dimethyl ether, diethyl ether, dipropyl ether, methyl ethyl ether and the like, inorganic gas(es) such as carbon gas, nitrogen, ammonia and the like. The carbon hydride having a boiling point of from −45 to 40° C. is preferable and propane, n-butane, iso-butane, n-pentane and iso-pentane are more preferable. It is noted that the blowing agent may be used alone or in combination of two or more kinds.

The expandable polystyrene resin particles of the present invention is prepared by supplying a flame-retardant solution into an aqueous suspension before or during impregnation of a blowing agent into the polystyrene resin particles dispersed in the aqueous suspension, in which the flame-retardant solution is prepared by dissolving in a plasticizer a powdery flame retardant which comprises tetrabromocyclooctane and a flame retardant aid, and impregnating the polystyrene resin particles with the flame retardant and the flame retardant aid. The impregnation is preferably carried out under pressure. The impregnation is preferably carried out under pressure. It is noted that the aqueous medium is not particularly limited as long as the aqueous medium has compatibility with the aqueous suspension in which the polystyrene resin particles are dispersed. Examples of the aqueous medium include water, alcohol and the like and water is preferable.

With regard to the above powdery flame retardant comprising tetrabromocyclooctane, silica fine powders are added in order to improve the dispersibility. That is, it is preferable that the above powdery flame retardant comprises tetrabromocyclooctane preliminarily dispersed by the silica fine powders. As a method for adding the silica fine powders to the tetrabromocyclooctane, they are preferably mixed in a mixture such as a Henschel mixer or the like for certain time.

The silica fine powders to be added to the powdery flame retardant comprising tetrabromocyclooctane may be either hydrophilic or hydrophobic as long as their specific surface area is 170 to 330 m$^2$/g and the specific surface area is most preferably 200 m$^2$/g. It is noted that when the specific surface area is less than 170 m$^2$/g, the dispersibility of the tetrabromocyclooctane can not be improved and as a result, the tetrabromocyclooctane has caused secondary aggregation. Also, when the specific surface area is larger than 330 m$^2$/g, the scattering amount of the silica fine powders is increased, thereby having caused a problem of deteriorating handling property in production.

The amount of adding the silica fine powders to the tetrabromocyclooctane is preferably 0.3 to 1.5 parts by weight relative to 98.5 to 99.7 parts by weight of the tetrabromocyclooctane and further, most preferably 0.5 parts by weight. When the additive amount is less than 0.3 parts by weight, the dispersibility of the tetrabromocyclooctane can not be improved and as a result, the tetrabromocyclooctane has caused secondary aggregation. Also, when the additive amount is larger than 1.5 parts by weight, the scattering amount of the silica fine powders is increased, thereby having caused a problem of deteriorating handling property in production.

Furthermore, a combination of the flame retardant aid with the above flame retardant can provide further excellent flame retardancy to the expandable resin particles. Such a flame retardant aid is not particularly limited. Examples of the flame retardant include dicumyl peroxide and the like. The one-hour half-life temperature of the flame retardant aid is preferably 100° C. to 250° C. When the content of the flame retardant aid in the expandable resin particles is small, the flame retardancy of the expandable resin particles may be lowered. On the other hand, even when the content of the flame retardant aid is large, the flame retardancy of the expandable resin particles often remains unchanged. Therefore, the content of the flame retardant aid is preferably 20 to 200 parts by weight relative to 100 parts by weight of the plasticizer, that is, 0.2 to 2.0 parts by weight and more preferably 0.2 to 1.5 parts by weight relative to 100 parts by weight of the expandable polystyrene resin.

Examples of such a plasticizer include organic materials having an SP value (Solubility parameter) of not less than 8.3 but not more than 9.4, preferably adipic acid esters having an SP value of not less than 8.5 but not more than 9.2. In particular, di-isobutyl adipate (SP value: 8.9) (DIBA) and di-isononyl adipate (DINA) are preferable. The SP value of the present invention is calculated by substituting ΔE and V into the following formula:

$(SP)^2 = \Delta E/V$ where ΔE is evaporation energy per unit volume of a molecule and V is mole volume.

The above flame-retardant solution is obtained by dissolving a powdery flame retardant and a flame retardant aid in a plasticizer. Such a plasticizer is not particularly limited as long as it dissolves the flame retardant. Examples of the plasticizer include adipic acid esters such as di-isobutyl adipate, di-isononyl adipate, as stated previously, as well as phthalic acid esters such as dioctyl phthalate, dibutyl phthalate, sebacic acid esters such as dibutyl sebacate, hydrocarbon series such as styrene, toluene, ethyl benzene, cyclohexane and the like. In particular, styrene and toluene are preferable.

When the content of the powdery flame retardant in the flame-retardant solution is small, the flame-retardant solution to be used becomes large in amount, which results in low impregnation of the flame retardant into the polystyrene resin particles. On the other hand, when the content of the powdery flame retardant in the flame-retardant solution is large, the flame retardant is hardly dissolved in the plasticizer. Therefore, the flame retardant is limited to 33 to 1000 parts by weight relative to 100 parts by weight of the plasticizer and it is preferably 100 to 550 parts by weight.

Furthermore, in supplying the flame-retardant solution into the aqueous suspension, the content of the flame retardant in the expandable polystyrene resin particles to be obtained is preferably adjusted to 0.3 to 2.0 parts by weight, more preferably 0.5 to 1.5 parts by weight relative to 100 parts by weight of the polystyrene resin particles which are to be impregnated with the flame retardant. This is because when the content of the flame retardant in the expandable polystyrene resin particles is small, the self-extinguishing property of the resulting thermoplastic polystyrene resin molded foam may be deteriorated.

Since the powdery flame retardant comprising tetrabromocyclooctane that is to be contained in the plasticizer is stably dispersed by silica fine powders, it is uniformly dispersed in the plasticizer. Furthermore, because the plasticizer is in a liquid state and it is uniformly and stably dispersed in the aqueous suspension, the powdery flame retardant uniformly dispersed in this plasticizer can be also uniformly and stably dispersed in the aqueous suspension. Therefore, the flame retardant can be uniformly impregnated into the respective polystyrene resin particles that are dispersed in the aqueous suspension and the impregnation can be performed with excellent impregnation efficiency.

The method for dissolving the powdery flame retardant and the flame retardant aid in the plasticizer is not particularly limited. Examples of the method include a method for heating the plasticizer to the given temperature and then adding the powdery flame retardant in the plasticizer while stirring this plasticizer, and the like.

The aqueous medium is not particularly limited as long as it has compatibility with the aqueous suspension in which the polystyrene resin particles are dispersed. Examples of the aqueous medium include water, alcohol and the like. However, it is preferable that the same aqueous medium as that of the aqueous suspension prepared by dispersing the polystyrene resin particles therein.

Moreover, when the aqueous medium to disperse the flame-retardant solution is small in amount, the flame-retardant solution can not be stably dispersed in the aqueous medium. On the other hand, when the aqueous medium is large in amount, the impregnation efficiency of the flame retardant into the polystyrene resin may be lowered. Therefore, it is limited to 100 to 3000 parts by weight relative to 100 parts by weight of the plasticizer in the flame-retardant solution and preferably 200 to 2000 parts by weight.

Additionally, when the flame-retardant solution is dispersed in the aqueous medium, a surfactant may be contained in the aqueous medium in order to lower the interface energy between the flame-retardant solution and the aqueous medium and disperse the flame-retardant solution more stably in the flame-retardant solution.

Such a surfactant is not particularly limited, and examples of the surfactant include anionic surfactants such as alkyl sulfate such as sodium lauryl sulfate or the like, alkylbenzene sulfonate such as sodium dodecylbenzene sulfonate or the like, higher fatty acid salt such as sodium oleate or the like, β-tetrahydroxynaphthalene sulfonate and the like; cationic surfactants such as alkyl ammonium acetates, alkyl dimethyl benzyl ammonium salts, alkyl trimethyl ammonium salts, dialkyl dimethyl ammonium salts, alkyl pyridinium salts, oxyalkylene alkylamines, polyoxyalkylene alkylamines, and the like; nonionic surfactants such as fatty acid diethanolamides, silicone series surfactants, polyoxyethylene alkyl ethers, polyoxyethylene alkyl phenyl ethers, polyoxyethylene-polyoxypropylene glycols, polyether-modified silicones and the like. The anionic surfactant is preferable and the alkylbenzene sulfonate is more preferable. It is noted that the surfactant may be used alone or in combination of two or more kinds.

When the used amount of the surfactant is small, the dispersibility of the flame-retardant solution in the aqueous medium is not improved. On the other hand, when the used amount is large, foaming caused by the surfactant becomes excessive, and troubles may arise in production. Therefore, the used amount is preferably 0.005 to 10 parts by weight, further preferably 0.05 to 5 parts by weight relative to 100 parts by weight of the plasticizer in the flame-retardant solution.

When the flame-retardant solution is dispersed in the aqueous medium, a poor water-soluble inorganic salt is preferably contained in the aqueous medium. Examples of such a poor water-soluble inorganic salt include tribasic calcium phosphate, hydroxyl-apatite, magnesium pyrophosphate, calcium pyrophosphate, calcium phosphate, magnesium phosphate, magnesium carbonate and the like. The magnesium pyrophosphate is preferable.

When the used amount of the poor water-soluble inorganic salt is small, the dispersibility of the flame-retardant solution in the aqueous medium may be lowered. On the other hand, when the used amount is large, the viscosity of a dispersion obtained by dispersing the flame-retardant solution is increased, resulting in that the flame-retardant solution can not be uniformly dispersed in the aqueous medium. Therefore, the used amount is preferably 10 to 500 parts by weight, further preferably 20 to 200 parts by weight relative to 100 parts by weight of the plasticizer in the flame-retardant solution.

As a method for dispersing the flame-retardant solution in the aqueous medium, it is enough as long as the plasticizer is dispersed in the aqueous medium in a state that all of the powdery flame retardant and the flame retardant aid are dissolved in the plasticizer. Examples thereof include a method comprising steps of: adding a surfactant or a poor water-soluble inorganic salt into an aqueous medium if necessary and heating them to the given temperature, then adding a powdery flame retardant, a flame retardant aid and a plasticizer thereto and stirring them; forming a flame-retardant solution by dissolving the powdery flame retardant in the plasticizer and right after that, dispersing the flame-retardant solution in the aqueous medium, a method comprising steps of: adding a surfactant or a poor water-soluble inorganic salt into an aqueous medium if necessary and heating them to the given temperature, preparing a flame-retardant solution by dissolving a powdery flame retardant in the plasticizer; and supplying this flame-retardant solution into the above aqueous medium and stirring to be dispersed therein, and the like.

The time for adding dispersions of the flame-retardant solution prepared by dispersing this flame-retardant solution or the flame-retardant solution in the aqueous medium to the aqueous suspension with the polystyrene resin particles dispersed therein may be either before or during the impregnation with the blowing agent. Also, the addition of the flame-retardant solution or dispersions of the flame retardant solution may be carried out in a way that the total amount of the flame-retardant solution or the dispersions of the flame-retardant solution may be added once, the dispersions of the flame-retardant solution or the flame-retardant solution may be added dividedly in a plurality of times, or the dispersions of the flame-retardant solution or the flame-retardant solution may be continuously added little by little.

The expandable polystyrene resin particles are prepared by impregnating the polystyrene resin particles dispersed in the aqueous suspension with a blowing agent, a flame retardant and a flame retardant aid. After that, these expandable polystyrene resin particles are taken out from the aqueous suspension, and if necessary, the expandable polystyrene resin particles may be subjected to washing treatment and drying treatment.

In addition, other than the flame retardant, additive agents such as a nuclear agent, a filler, a lubricant, a colorant, a solvent and the like can be added to the expandable polystyrene resin particles to such an extent as not to impair the physical properties thereof if necessary. When these additive agents are added to the expandable polystyrene resin particles, the additive agents may be added into the aqueous suspension with polystyrene resin particles dispersed therein, or the additive agents may be added into the flame-retardant solution or the dispersions of the flame-retardant solution.

Next, explanation will be given on a method for producing a polystyrene resin molded foam using the above expandable polystyrene resin particles. As a method for producing a polystyrene resin molded foam using the above expandable polystyrene resin particles, the known methods can be employed. Specifically, a polystyrene resin molded foam can be obtained by heating and pre-expanding the above expandable polystyrene resin particles so as to prepare polystyrene resin pre-expanded particles having a high density of around 0.01 to 0.05 g/cm$^3$, filling these polystyrene resin pre-expanded particles into a cavity of a mold, heating and expanding them.

In addition, the average chord length of the foam is preferably 20 to 380 μm, more preferably 40 to 350 μm. This is because when the average chord length of cells in the molded foam is smaller, the number of cell walls in the molded foam, that is, the surface area of the cell walls becomes too large, so that each thickness of the cell walls is decreased, and while the number of cell walls becomes larger and the number of times of heat insulation becomes higher, the degree of reduction in heat insulation effect due to the cell walls is more increased, resulting in deterioration of the heat-insulating property of the molded foam. On the other hand, it is because when the average chord length of the molded foam is larger, the total number of the cells in the thickness direction of the molded foam is decreased, resulting in decrease of the number of times of heat insulation due to the cell walls and lowering of the heat insulating property of the molded foam.

In addition, when the present invention is used for a heat-insulating material for a roof insulating material, the average chord length is preferably 50 µm to 30 µm. This is because when the average chord length of the cells in the molded foam is smaller, the number of cell walls in the molded foam, that is, the surface area of the cell walls becomes too large, so that each thickness of the cell walls is decreased, and while the number of cell walls becomes larger and the number of times of heat insulation becomes higher, the degree of reduction in heat insulation effect due to the cell walls is more increased, resulting in increase in contraction of the molded foam. On the other hand, it is because when the average chord length of the molded foam is larger, the total number of the cells in the thickness direction of the molded foam is decreased, resulting in lowering of the strength of the molded foam.

When the present invention is applied to expandable polystyrene resin particles for a heat-insulating material, which are used under the floor of a house, the average chord length of the foam is preferably 20 to 150 µm, more preferably 30 to 120 µm. This is because when the average chord length of the cells in the molded foam is smaller, the number of the cell walls in the molded foam, that is, the surface area of the cell walls becomes too large, so that each thickness of the cell walls is decreased, and while the number of cell walls becomes larger and the number of times of heat insulation becomes higher, the degree of reduction in heat insulation effect due to the cell walls is more increased, resulting in increase in contraction of the molded foam. On the other hand, it is because when the average chord length of the molded foam is larger, the total number of the cells in the thickness direction of the molded foam is decreased, resulting in lowering of the strength of the molded foam.

When the present invention is applied to expandable polystyrene resin particles for a heat-insulating material, which are used for a hot water storage tank of a heat pump type water heater, the average chord length of the foam is preferably 40 to 380 µm, more preferably 45 to 370 µm. Furthermore, when the present invention is used for a heat insulating material for a heat pump type water heater, it is preferably 50 to 350 µm. This is because when the average chord length of the cells in the molded foam is smaller, the number of the cell walls in the molded foam, that is, the surface area of the cell walls becomes too large, so that each thickness of the cell walls is decreased, and while the number of cell walls becomes larger and the number of times of heat insulation becomes higher, the degree of reduction in heat insulation effect due to the cell walls is more increased, resulting in deterioration of the heat insulating property of the molded foam. On the other hand, it is because when the average chord length of the molded foam is larger, the total number of the cells in the thickness direction of the molded foam is decreased, resulting in decrease of the number of times of heat insulation due to the cell walls and lowering of the heat insulating property of the molded foam.

When the present invention is applied to expandable polystyrene resin particles for a heat-insulating material, which are used for a car interior material, the average chord length of the molded foam is preferably 20 to 200 µm, more preferably 30 to 180 µm. Furthermore, when the present invention is used for a car interior material, it is preferably 40 to 150 µm. This is because when the average chord length of the cells in the molded foam is smaller, the number of the cell walls in the molded foam, that is, the surface area of the cell walls becomes too large, so that each thickness of the cell walls is decreased, and while the number of cell walls becomes larger and the number of times of heat insulation becomes higher, the degree of reduction in heat insulation effect due to the cell walls is more increased, resulting in increase in contraction of the molded foam. On the other hand, it is because when the average chord length of the molded foam is larger, the total number of cells in the thickness direction of the molded foam is decreased, resulting in lowering of the strength of the molded foam.

When the present invention is applied to expandable polystyrene resin particles for a heat-insulating material, which are used for a embankment material, the average chord length of the foam is preferably 20 to 150 µm, more preferably 40 to 120 µm. This is because when the average chord length of the cells in the molded foam is smaller, the number of the cell walls in the molded foam, that is, the surface area of the cell walls becomes too large, so that each thickness of the cell walls is decreased, and while the number of cell walls becomes larger and the number of times of heat insulation is higher, the degree of reduction in heat insulation effect due to the cell walls is more increased, resulting in increase in contraction of the molded foam. On the other hand, it is because when the average chord length of the molded foam is larger, the total number of the cells in the thickness direction of the molded foam is decreased, resulting in lowering of the strength of the molded foam.

When the density of the above polystyrene resin molded foam of the present invention is low, a closed cell ratio of the polystyrene resin molded foam is lowered and heat-insulating property or mechanical strength of the polystyrene resin molded foam may be lowered. On the other hand, when the density is high, time required for one cycle in in-mold foam molding is elongated and the productivity efficiency of the polystyrene resin molded foam may be decreased. Therefore, the density is preferably 0.01 to 0.05 $g/cm^3$. Furthermore, when the present invention is used for a roof insulating material, the density is preferably 0.018 to 0.033 $g/cm^3$. Furthermore, when the present invention is used for an underfloor heat-insulating material, the density is preferably 0.020 to 0.028 $g/cm^3$. Furthermore, when the present invention is used for a heat-insulating material for a hot water storage tank of a heat pump type water heater, the density is preferably 0.016 to 0.033 $g/cm^3$. Furthermore, when the present invention is used for a car interior material, the density is preferably 0.016 to 0.066 $g/cm^3$.

Furthermore, when the present invention is used for a embankment material, the density is preferably 0.01 to 0.033 $g/cm^3$.

EXAMPLES

Hereinafter, the present invention is illustrated by Examples and Comparative Examples, but the present invention is not limited to these.

Example 1

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and further, the temperature inside the autoclave was raised up to 120° C. and maintained at 120° C. for two hours, thereby carrying out suspension polymerization of styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining polystyrene particles having a particle diameter of 0.2 to 0.8 mm and a weight average molecular weight of 240,000.

Next, 35 kg of ion-exchange water, 4 g of sodium dodecylbenzenesulfonate and 200 g of magnesium pyrophosphate were supplied to another autoclave having 100 litters equipped with a stirrer, followed by supplying 8000 g of the above polystyrene particles as seed particles into the autoclave and stirring them to be uniformly dispersed in water.

Besides the above, while a dispersant prepared by dissolving 3 g of sodium dodecylbenzenesulfonate in 5 kg of ion-exchange water was prepared, a styrene-based monomer solution was prepared by dissolving 100 g of 2,5-dimethyl-2,5-di(benzoyl peroxide) hexane (ten-hour half-life temperature: 100° C.) and 100 g of dicumyl peroxide (ten-hour half-life temperature: 116° C.), which are polymerization initiators, in 1994 g of styrene, 500 g of α-methyl styrene and 6 g of divinylbenzene. This styrene-based monomer solution was added to the above dispersion and stirred with a homomixer, and the mixture was then emulsified, thereby obtaining an emulsion.

After the temperature inside the autoclave was heated to and maintained at 80° C., the above emulsion was added into the autoclave and the temperature was maintained for 30 minutes so as to smoothly absorb the styrene, α-methyl styrene, divinylbenzene and the polymerization initiators into the polystyrene seed particles. After that, the temperature inside the autoclave was raised from 80° C. to 118° C. at a temperature rise rate of 1° C. per minute. When the temperature reaches 118° C., 22000 g of styrene and 7500 g of α-methyl styrene were continuously dropped into the autoclave for 480 minutes. Next, 60 minutes after completing the dropping of the styrene monomer, the temperature was raised up to 140° C. at a temperature rise rate of 1° C. per minute and maintained for 120 minutes, and therefore, polystyrene particles were obtained by seed polymerization. All of the styrene, α-methyl styrene and divinylbenzene were used in polymerization.

A flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

Furthermore, a flame-retardant solution is prepared by heating 240 g of styrene that is a plasticizer to 50° C., supplying 440 g of the flame retardant A and as a flame retardant aid, 140 g of dicumyl peroxide (one-hour half-life temperature: 136° C.) to the styrene while stirring this and stirring that until the flame retardant A is completely dissolved in the styrene to form a transparent solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) and 1600 g of pentane (iso-pentane/n-pentane (weight ratio)=20/80) were pressed into the autoclave under nitrogen pressure for 30 minutes and the temperature inside the autoclave was raised up to the temperature as shown in "Temperature of impregnating with blowing agent" of Table 1 and maintained at that temperature for four hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.30 to 1.2 mm and an average particle diameter of 0.75 mm. It is noted that the flame-retardant solution was entirely impregnated into the polystyrene particles.

Example 2

6 g of sodium dodecylbenzenesulfonate and 112 g of magnesium pyrophosphate obtained by a metathesis method were supplied to 2 kg of ion exchange water and they were stirred. Then, while being heated to and maintained at 50° C., 240 g of the styrene, 440 g of the flame retardant A and 140 g of the flame retardant aid, dicumyl peroxide were added to the above ion exchange water and stirred with a homomixer ("T.K. Homomixer, MARKII f model" manufactured by Tokushu Kika Kogyo Kabushiki Kaisha) at 7000 rpm for 30 minutes.

Then, the flame retardant A and the flame retardant aid were completely dissolved therein to form a flame-retardant solution, and right after that, this flame-retardant solution was dispersed in the ion exchange water, thereby forming dispersions of the flame-retardant solution. Then, expandable polystyrene particles were obtained as in Example 1 except that the obtained dispersions of the flame-retardant solution were supplied into the autoclave instead of the flame-retardant solution.

Example 3

Expandable polystyrene particles were obtained as in Example 2 except that the amount of the flame retardant A was 360 g instead of 440 g.

Example 4

Expandable polystyrene particles were obtained as in Example 2 except that the amount of the flame retardant A was 560 g instead of 440 g.

Example 5

Expandable polystyrene particles were obtained as in Example 2 except that the amount of the flame retardant A was 680 g instead of 440 g.

Example 6

Expandable polystyrene particles were obtained as in Example 2 except that the amount of the styrene was 80 g instead of 240 g.

Example 7

Expandable polystyrene particles were obtained as in Example 2 except that the amount of the styrene was 400 g instead of 240 g.

Example 8

Expandable polystyrene particles were obtained as in Example 2 except that the temperature of impregnating with the blowing agent was set at 98° C. instead of 100° C.

Example 9

Expandable polystyrene particles were obtained as in Example 2 except that the temperature of impregnating with the blowing agent was set at 95° C. instead of 100° C.

Example 10

Expandable polystyrene particles were obtained as in Example 2 except that the temperature of impregnating with the blowing agent was set at 105° C. instead of 100° C.

Comparative Example 1

Expandable polystyrene particles were obtained as in Example 1 except that 560 g of the powdery tetrabromocyclooctane was directly supplied into the autoclave instead of the flame-retardant solution. It is noted that when the inside of a reactor was visually observed, 280 g of flame-retardant aggregates were generated at the bottom of the reactor and the total amount of the flame retardant was not absorbed into the expandable polystyrene resin particles. As a result, non-uniform absorption of the flame retardant occurred and there were observed concavities and convexities in the fused parts between expanded particles of the molded foam.

Comparative Example 2

Expandable polystyrene particles were obtained as in Example 1 except that 440 g of the powdery tetrabromocyclooctane was directly supplied into the autoclave instead of the flame-retardant solution. It is noted that when the inside of the reactor was visually observed, 32 g of flame-retardant aggregates were generated at the bottom of the reactor and the total amount of the flame retardant was not absorbed into the expandable polystyrene resin particles. As a result, non-uniform absorption of the flame retardant occurred and there were observed concavities and convexities in the fused parts between expanded particles of the molded foam.

Comparative Example 3

Expandable polystyrene particles were obtained as in Example 3 except that silica was not used in manufacturing the flame retardant A. It is noted that when the inside of the reactor was visually observed, 30 g of flame retardant aggregate was generated at the bottom of the reactor and the total amount of the flame retardant was not absorbed into the expandable polystyrene resin particles. As a result, non-uniform absorption of the flame retardant occurred and there were observed concavities and convexities in the fused parts between expanded particles of the molded foam.

Comparative Example 4

Expandable polystyrene particles were obtained as in Example 2 except that the amount of the flame retardant A was 80 g instead of 440 g. As a result, non-uniform absorption of the flame retardant occurred and there were observed concavities and convexities in the fused parts between expanded particles of the molded foam.

Comparative Example 5

Expandable polystyrene particles were obtained as in Example 2 except that the amount of the flame retardant A was 1200 g instead of 440 g. When the average chord length of the obtained molded foam was measured, cell fineness was observed because the flame retardant was used in a large amount. As a result, there were observed concavities and convexities in the fused parts between expanded particles of the molded foam.

Comparative Example 6

Expandable polystyrene particles were obtained as in Example 2 except that the temperature of impregnating with the blowing agent was set at 85° C. instead of 100° C. When the average chord length of the obtained molded foam was measured, it was 450 μm and its heat insulation property is therefore deteriorated.

Comparative Example 7

Expandable polystyrene particles were obtained as in Example 2 except that the temperature of impregnating with the blowing agent was set at 115° C. instead of 100° C. When the average chord length of the obtained molded foam was measured, it was 35 μm and its heat insulation property is therefore deteriorated.

(Method for Measuring Silica Specific Surface Area)

All methods of measuring the specific surface area of the silica fine powders, which are used in the present invention, are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it.

Δ . . . The flame retardant is hardened in a hard state, but crumbled when grasping it.

○ . . . The flame retardant is of firm texture, but there are no lumps and it is in a powder state.

With regard to the obtained expandable polystyrene particles, pre-expandability, expansion moldability, flame retardancy and an average chord length of cells in the molded foam were measured by the following methods and the obtained results were shown in Table 1.

(Pre-Expandability)

40000 g of the obtained expandable polystyrene particles and as top coating agents, 20 g of polyethylene glycol, 60 g of zinc stearate, 40 g of 12-hydroxystearic acid triglyceride (trade name "K-3 Wax 500" manufactured by Kawaken Fine Chemicals Co., Ltd.) and 20 g of stearic acid monoglyceride (trade name "RIKEMAL S-100P" manufactured by RIKEN VITAMIN CO., LTD.) were supplied into a tumbler mixer and they were stirred for 30 minutes, thereby coating the surfaces of the expandable polystyrene particles with the top coating agents.

Next, after the expandable polystyrene particles were stored in a cooling warehouse having 15° C. for 48 hours, 500 g of the expandable polystyrene particles were supplied into a pre-expander equipped with a stirrer and pre-expanded by heating with water vapor, thereby obtaining pre-expanded particles with 50 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

The appearance of the molded foam was visually observed and evaluated according to the following standard.

○ . . . The fused parts between the expanded particles were flat and smooth.

x . . . Concavities and convexities were generated in the fused parts between the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 1 and 2. According to the above JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

○ . . . Flame-out time is within three seconds and in all of the five test specimens, afterglow does not exist, nor does flame spread beyond an indicating line of flammability limit.

⊚ . . . Flame-out time is within one second and in all of the five test specimens, afterglow does not exist, nor does flame spread beyond an indicating line of flammability limit.

(Average Chord Length)

The figures measured according to the test method for ASTM D2842-69 are defined as the average chord length of the molded foam. Specifically, the molded foam is cut into substantially two equal parts and the cut surface is photographed at a magnification of 100 times by using a scanning Electron Microscope (trade name "S-3000N" manufactured by Hitachi, Ltd.). The photographed image is printed onto A4 paper, at an arbitrary position of which a 60 mm long straight line is drawn. The average chord length (t) of cells is calculated from the number of the cells that are present on this straight line by the following formula.

Average chord length $t=60/($number of cells×magnification ratio of photograph$)$ In drawing a straight line, when the straight line comes into point contact with the cells, these cells are included in the number of cells as much as possible. Further, when both ends of the straight line are also located within cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

(Heat Conductivity)

From the molded foam, a test specimen having a rectangular parallelepiped shape of 200 mm length×200 mm width× 10 to 25 mm height was cut out.

Using measuring equipment commercially available from EKO Instruments Co., Ltd. under the trade name "HC-074/200", a low-temperature plate of the measuring equipment was set lower by 15° C. than the average temperature of the test specimen and a high-temperature plate thereof was set higher by 15° C. than the average temperature of the test specimen, followed by measuring the heat conductivity of the test specimen according to the method as described in JIS A 1412-2:1999 "Measuring Method for Heat Resistance and Heat Conductivity of Heat Insulators—Part 2: Heat flow meter method (HFM method)". It is noted that the average temperature of the test specimens was defined as 0, 20 and 30° C. Based on the obtained heat conductivity, a regression line with the abscissa axis representing temperature and the ordinate axis representing heat conductivity was drawn and the heat conductivity of the test specimen at 23° C. was calculated.

With regard to an extrusion method polystyrene standard plate (NIST-SRM1453) from U.S. National Institute of Standards and Technology, its heat conductivity was measured by the same method as described above. With the heat conductivity of the extrusion method polystyrene standard plate and the nominal value thereof (calculated value at 23° C.), a correction of the measuring equipment was performed by the following formula, thereby defining the corrected value as the heat conductivity of the test specimen.

Heat conductivity $\lambda(W/m\cdot K)$=Heat conductivity of test specimen at 23° C.×nominal value of extrusion method polystyrene standard plate (calculated value at 23° C.)/Heat conductivity of extrusion method polystyrene standard plate at 23° C.

TABLE 1

| | | | | Example | | | | | |
|---|---|---|---|---|---|---|---|---|---|
| | | | | 1 | 2 | 3 | 4 | 5 | 6 |
| Impregnation solution | Flame-retardant | Plasticizer | (part by weight) | 100 | 100 | 100 | 100 | 100 | 100 |
| | | Flame retardant | (part by weight) | 183 | 183 | 150 | 233 | 283 | 550 |
| | | Flame retardant aid | (part by weight) | 58 | 58 | 58 | 58 | 58 | 175 |
| | | Aqueous medium | (part by weight) | — | 833 | 833 | 833 | 833 | 2500 |
| | | Surfactant | (part by weight) | — | 2.5 | 2.5 | 2.5 | 2.5 | 7.5 |
| | | Hardly | (part by weight) | — | 46.7 | 46.7 | 46.7 | 46.7 | 140 |

TABLE 1-continued

|  |  |  |  |  |  |  |  |  |  |
|---|---|---|---|---|---|---|---|---|---|---|
|  |  | water-soluble inorganic salt |  |  |  |  |  |  |  |  |
|  | Resin particles | Amount of flame retardant | (part by weight) | 1.1 | 1.1 | 0.9 | 1.4 | 1.7 | 1.1 |
|  |  | Amount of flame retardant aid | (part by weight) | 0.35 | 0.35 | 0.35 | 0.35 | 0.35 | 0.35 |
|  | Temperature of impregnating with blowing agent |  | ° C. | 100 | 100 | 100 | 100 | 100 | 100 |
|  | Flame retardant aggregates |  | g | 0 | 0 | 0 | 0 | 0 | 0 |
| Flame retardant A | TBCO |  | (part by weight) | 99.5 | 99.5 | 99.5 | 99.5 | 99.5 | 99.5 |
|  | Silica |  | (part by weight) | 0.5 | 0.5 | 0.5 | 0.5 | 0.5 | 0.5 |
|  | Blocking evaluation of flame retardant A |  |  | ○ | ○ | ○ | ○ | ○ | ○ |
| Evaluation | Flame retardant test | Flame-out time | (sec) | 1.5 | 1.5 | 1.8 | 1.3 | 1.0 | 2.2 |
|  |  | Comprehensive evaluation |  | ○ | ○ | ○ | ○ | ◎ | ○ |
|  | Average chord length |  | (μm) | 140 | 150 | 160 | 140 | 130 | 160 |
|  | Appearance evaluation of foam |  |  | ○ | ○ | ○ | ○ | ○ | ○ |
|  | Heat conductivity |  | (W/m · K) | 0.034 | 0.034 | 0.034 | 0.034 | 0.034 | 0.034 |

|  |  |  |  |  | Example | | | |
|---|---|---|---|---|---|---|---|---|
|  |  |  |  |  | 7 | 8 | 9 | 10 |
| Impregnation | Flame-retardant solution | Plasticizer | (part by weight) | | 100 | 100 | 100 | 100 |
|  |  | Flame retardant | (part by weight) | | 110 | 183 | 183 | 183 |
|  |  | Flame retardant aid | (part by weight) | | 35 | 58 | 58 | 58 |
|  |  | Aqueous medium | (part by weight) | | 500 | 833 | 833 | 833 |
|  |  | Surfactant | (part by weight) | | 1.5 | 2.5 | 2.5 | 2.5 |
|  |  | Hardly water-soluble inorganic salt | (part by weight) | | 28 | 46.7 | 46.7 | 46.7 |
|  | Resin particles | Amount of flame retardant | (part by weight) | | 1.1 | 1.1 | 1.1 | 1.1 |
|  |  | Amount of flame retardant aid | (part by weight) | | 0.35 | 0.35 | 0.35 | 0.35 |
|  | Temperature of impregnating with blowing agent |  | ° C. | | 100 | 98 | 95 | 105 |
|  | Flame retardant aggregates |  | g | | 0 | 0 | 0 | 0 |
| Flame retardant A | TBCO |  | (part by weight) | | 99.5 | 99.5 | 99.5 | 99.5 |
|  | Silica |  | (part by weight) | | 0.5 | 0.5 | 0.5 | 0.5 |
|  | Blocking evaluation of flame retardant A |  |  | | ○ | ○ | ○ | ○ |
| Evaluation | Flame retardant test | Flame-out time | (sec) | | 2.3 | 1.5 | 1.5 | 1.5 |
|  |  | Comprehensive evaluation |  | | ○ | ○ | ○ | ○ |
|  | Average chord length |  | (μm) | | 170 | 185 | 220 | 50 |
|  | Appearance evaluation of foam |  |  | | ○ | ○ | ○ | ○ |
|  | Heat conductivity |  | (W/m · K) | | 0.034 | 0.034 | 0.036 | 0.036 |

TABLE 2

|  |  |  |  |  | Comparative Example | | | | | | |
|---|---|---|---|---|---|---|---|---|---|---|---|
|  |  |  |  |  | 1 | 2 | 3 | 4 | 5 | 6 | 7 |
| Impregnation | Flame-retardant solution | Plasticizer | (part by weight) | | — | — | 100 | 100 | 100 | 100 | 100 |
|  |  | Flame retardant | (part by weight) | | — | — | 183 | 33 | 500 | 183 | 183 |
|  |  | Flame retardant aid | (part by weight) | | — | — | 58 | 58 | 58 | 58 | 58 |
|  |  | Aqueous medium | (part by weight) | | — | — | 833 | 833 | 833 | 833 | 833 |
|  |  | Surfactant | (part by weight) | | — | — | 2.5 | 2.5 | 2.5 | 2.5 | 2.5 |
|  |  | Hardly water-soluble inorganic salt | (part by weight) | | — | — | 46.7 | 46.7 | 46.7 | 46.7 | 46.7 |
|  | Resin particles | Amount of flame retardant | (part by weight) | | 1.4 | 1.1 | 1.1 | 0.2 | 3 | 1.1 | 1.1 |
|  |  | Amount of flame retardant aid | (part by weight) | | 0.35 | 0.35 | 0.35 | 0.35 | 0.35 | 0.35 | 0.35 |
|  | Temperature of impregnating with blowing agent |  | ° C. | | 100 | 100 | 100 | 100 | 100 | 85 | 115 |
|  | Flame retardant aggregates |  | g | | 280 | 32 | 30 | 0 | 0 | 0 | 0 |
| Flame retardant A | TBCO |  | (part by weight) | | 100 | 100 | 100 | 99.5 | 99.5 | 99.5 | 99.5 |
|  | Silica |  | (part by weight) | | 0 | 0 | 0 | 0.5 | 0.5 | 0.5 | 0.5 |
|  | Blocking evaluation of flame retardant A |  |  | | Δ | X | X | ○ | ○ | ○ | ○ |
| Evaluation | Flame retardant test | Flame-out time | (sec) | | Burning | 2.6 | 2.4 | Burning | 0.7 | 1.5 | 1.5 |
|  |  | Comprehensive evaluation |  | | ○ | ○ | ○ | X | ◎ | ○ | ○ |
|  | Average chord length |  | (μm) | | 180 | 190 | 260 | 300 | 35 | 450 | 35 |
|  | Appearance evaluation of foam |  |  | | X | X | X | 0 | X | X | X |
|  | Heat conductivity |  | (W/m · K) | | 0.035 | 0.035 | 0.034 | 0.034 | 0.037 | 0.036 | 0.037 |

Example 10

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer with and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and further, the temperature inside the autoclave was raised up to 120° C. and maintained at 120° C. for two hours, thereby carrying out suspension polymerization of styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining the polystyrene particles having a particle diameter of 0.2 to 0.8 mm and a weight average molecular weight of 240,000.

Next, 35 kg of ion-exchange water, 4 g of sodium dodecylbenzenesulfonate and 200 g of magnesium pyrophosphate were supplied to another autoclave having 100 litters equipped with a stirrer, followed by supplying 8000 g of the above polystyrene particles as seed particles into the autoclave and stirring them to be uniformly dispersed in water.

Besides the above, while a dispersant obtained by dissolving 3 g of sodium dodecylbenzenesulfonate in 5 kg of ion-exchange water was prepared, a styrene-based monomer solution was prepared by dissolving 100 g of 2,5-Dimethyl-2,5-di(benzoylperoxy)hexane (ten-hour half-life temperature: 100° C.) and 100 g of dicumyl peroxide (ten-hour half-life temperature: 116° C.), which are polymerization initiators, in 1994 g of styrene, 500 g of α-methyl styrene and 6 g of divinyl benzene. This styrene-based monomer solution was added to the above dispersion liquid and stirred with a homomixer, and the mixture was then emulsified, thereby obtaining an emulsion.

Then, the temperature inside the autoclave was heated to and maintained at 80° C., the above emulsion was added into the autoclave and the temperature was maintained for 30 minutes so as to smoothly absorb the styrene, α-methyl styrene, divinylbenzene and the polymerization initiators into the polystyrene seed particles. After that, the temperature inside the autoclave was raised from 80° C. to 118° C. at a temperature rise rate of 1° C. per minute. When the temperature reaches 118° C., 22000 g of styrene and 7500 g of α-methyl styrene were continuously dropped into the autoclave for 480 minutes. Next, 60 minutes after completing the dropping of the styrene monomer, the temperature was raised up to 140° C. at a temperature rise rate of 1° C. per minute and maintained at the temperature for 120 minutes, and therefore, polystyrene particles were obtained by seed polymerization. Moreover, all of the styrene, α-methyl styrene and divinylbenzene were used in polymerization.

Moreover, a flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

Furthermore, 6 g of sodium dodecylbenzenesulfonate and 112 g of magnesium pyrophosphate obtained by a metathesis method were supplied to 2 kg of ion exchange water and they were stirred. Then, while being heated to and maintained at 50° C., 240 g of toluene as a plasticizer, 440 g of the flame retardant A and 140 g of a flame retardant aid, dicumyl peroxide were added into the above ion exchange water and stirred with a homomixer (T.K. Homomixer, MARKII f model, manufactured by Tokushu Kika Kogyo Kabushiki Kaisha) at 7000 rpm for 30 minutes. Then, the flame retardant A and the flame retardant aid were completely dissolved therein to form a flame-retardant solution, and right after that, this flame-retardant solution was dispersed in the ion exchange water, thereby forming dispersions of the flame-retardant solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) and 1600 g of pentane (iso-pentane/n-pentane (weight ratio)=20/80) were pressed into the autoclave as blowing agents under nitrogen pressure for 30 minutes and the temperature inside the autoclave was raised up to the temperature as shown in "Temperature of impregnating with blowing agent" of Table 3 and maintained at the temperature for four hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.80 to 1.2 mm and an average particle diameter of 1.0 mm. It is noted that the flame-retardant solution was entirely impregnated into the polystyrene particles.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 12

Expandable polystyrene particles were obtained as in Example 11 except that the amount of the flame retardant A was 360 g instead of 440 g.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 13

Expandable polystyrene particles were obtained as in Example 11 except that the amount of the flame retardant A was 679 g instead of 440 g.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 14

Expandable polystyrene particles were obtained as in Example 11 except that the temperature of impregnating with the blowing agents was set at 93° C. instead of 95° C.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 15

Expandable polystyrene particles were obtained as in Example 11 except that the temperature of impregnating with the blowing agent was set at 98° C. instead of 95° C.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 16

Expandable polystyrene particles were obtained as in Example 11 except that expandable polystyrene resin particles having a CV value of 9.31% were used.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 17

Expandable polystyrene particles were obtained as in Example 11 except that expandable polystyrene resin particles having a CV value of 6.09% were used.

When a molded foam obtained by filling pre-expanded particles which were pre-expanded by using these expandable polystyrene particles into a mold and letting them expand was prepared, its filling property into a cavity was good. In addition, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Comparative Example 8

When expandable polystyrene resin particles having a CV value of 20.80% were used, the filling property of pre-expanded particles during molding into the cavity was poor, so that a molded foam could not be obtained.

Comparative Example 9

Expandable polystyrene particles were obtained as in Example 11 except that the amount of the flame retardant A was 80 g instead of 440 g. Therefore, non-uniform absorption of the flame retardant occurred and concavities and convexities were observed in fused parts between the expanded particles of the molded foam.

Comparative Example 10

Expandable polystyrene particles were obtained as in Example 11 except that the amount of the flame retardant A was 1200 g instead of 440 g. When the average chord length of the obtained molded foam was measured, cell fineness was observed because the flame retardant was used in a large amount. Therefore, concavities and convexities were observed in fused parts between the expanded particles of the molded foam.

Comparative Example 11

Expandable polystyrene particles were obtained as in Example 11 except that the temperature of impregnating with the blowing agent was set at 80° C. instead of 100° C. When the average chord length of the obtained molded foam was measured, it was 480 μm and the heat insulation property was poor.

Comparative Example 12

Expandable polystyrene particles were obtained as in Example 11 except that the temperature of impregnating with the blowing agent was set at 110° C. instead of 100° C. When the average chord length of the obtained molded foam was measured, it was 25 μm and the heat insulation property was poor.

(Method for Measuring Average Particle Diameter)

Using a Ro-tap type sieve shaker (manufactured by Iida Seisakusho Co. Ltd.), about 50 to 100 g of specimens were classified for ten minutes with a JIS standard sieve of 4.00 mm sieve aperture, 3.35 mm aperture, 2.80 mm aperture, 2.36 mm aperture, 2.00 mm aperture, 1.70 mm aperture, 1.40 mm aperture, 1.18 mm aperture, 1.00 mm aperture, 0.85 mm aperture, 0.71 mm aperture, 0.60 mm aperture, 0.50 mm aperture, 0.425 mm aperture, 0.355 mm aperture, 0.300 mm aperture, 0.250 mm aperture, 0.212 mm aperture, 0.180 mm aperture. The weights of the specimens on a sieve mesh were measured and from the results, a cumulative weight distribution curve was obtained.

The particle diameter whose cumulative weight is 50% (median diameter) based on the cumulative weight distribution curve is called the average particle diameter.

(Method for Measuring Coefficient of Variation (CV Value) of the Diameter of Polystyrene Resin Particles)

A coefficient of variation (CV value) of the diameter of polystyrene resin particles is the value calculated by substituting a standard deviation (δ) of the particle diameter and an average particle diameter (x) into the following formula.

$$CV\ value(\%) = (\delta/x) \times 100$$

(Method for Measuring Silica Specific Surface Area)

All methods for measuring the specific surface area of the silica fine powders used in the present invention are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it.

Δ . . . The flame retardant is hardened in a hard state, but crumbled when grasping it.

◯ . . . The flame retardant is of firm texture, but there are no lumps, and it is in a powder state.

With regard to the obtained expandable polystyrene particles, the pre-expandability, expansion moldability, flame retardancy and an average chord length of cells in the molded foam were measured by the following methods and the obtained results were shown in Table 3.

(Pre-Expandability)

40000 g of the obtained expandable polystyrene particles and as top coating agents, 20 g of polyethylene glycol, 60 g of zinc stearate, 40 g of 12-hydroxystearic acid triglyceride (trade name "K-3 Wax 500" manufactured by Kawaken Fine Chemicals Co., Ltd.) and 20 g of stearic acid monoglyceride (trade name "RIKEMAL S-100P" manufactured by RIKEN VITAMIN CO., LTD.) were supplied into a tumbler mixer and they were stirred for 30 minutes, thereby coating the surfaces of the expandable polystyrene particles with the top coating agents.

Next, after the expandable polystyrene particles were stored in a cooling warehouse having 15° C. for 48 hours, 500 g of the expandable polystyrene particles were supplied into a pre-expander equipped with a stirrer and pre-expanded by heating with water vapor, thereby obtaining pre-expanded particles with 50 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

Each appearance of molded foams was visually observed and evaluated according to the following standard.

◯ . . . The fused parts between expanded particles were flat and smooth.

x . . . Concavities and convexities were generated in the fused parts between the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 3 and 4. According to the above JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

◯ . . . Flame-out time is within three seconds and in all of the five test specimens, afterglow does not exist, nor does flame spread beyond an indicating line of flammability limit.

⊚ . . . Flame-out time is within one second and in all of the five test specimens, afterglow does not exist, nor does flame spread beyond an indicating line of flammability limit.

(Average Chord Length)

The average chord length of the molded foam is obtained by measuring according to the test method for ASTM D2842-69. Specifically, the molded foam is cut into substantially two equal parts and the cut surface is photographed at a magnification of 100 times by the use of a scanning Electron Microscope (trade name "S-3000N" manufactured by Hitachi, Ltd.). The photographed image is printed onto A4 paper, at an arbitrary position of which a 60 mm long straight line is drawn. From the number of the cells that are present on this straight line, the average chord length (t) of cells is calculated by the following formula.

Average chord length $t=60/$(number of cells×magnification ratio of photograph)

In drawing a straight line, when the straight line comes into point contact with the cells, these cells are also included in the number of cells as much as possible. Further, when both ends of the straight line are located within cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

(Heat Conductivity)

From the molded foam, a test specimen having a rectangular parallelepiped shape of 200 mm length×200 mm width× 10 to 25 mm height was cut out.

Using measuring equipment commercially available from EKO Instruments Co., Ltd. under the trade name "HC-074/200", a low-temperature plate of the measuring equipment was set lower by 15° C. than the average temperature of the test specimen and a high-temperature plate thereof was set higher by 15° C. than the average temperature of the test specimen, followed by measuring the heat conductivity of the test specimen according to the method as described in JIS A 1412-2:1999 "Measuring Method for Heat Resistance and Heat Conductivity of Heat Insulators—Part 2: Heat flow meter method (HFM method)". It is noted that the average temperature of the test specimens was defined as 0, 20, and 30° C. Based on the obtained heat conductivity, a regression line with the abscissa axis representing temperature and the ordinate axis representing heat conductivity was drawn and the heat conductivity of the test specimen at 23° C. was calculated.

With regard to an extrusion method polystyrene standard plate (NIST-SRM1453) from U.S. National Institute of Standards and Technology, its heat conductivity was measured by the same method as described above. With the heat conductivity of the extrusion method polystyrene standard plate and the nominal value thereof (calculated value at 23° C.), a correction of the measuring equipment was performed by the following formula, thereby defining the corrected value as heat conductivity of the test specimen.

Heat conductivity $\lambda(W/m\cdot K)$=Heat conductivity of test specimen at 23° C.×nominal value of extrusion method polystyrene standard plate (calculated value at 23° C.)/Heat conductivity of extrusion method polystyrene standard plate at 23° C.

(Heat Resistance)

From the molded foam, test specimens each having a rectangular parallelepiped shape of 120 mm length×120 mm width×30 mm height were cut out. Heat shrinking of these test specimens after left for 168 hours at 90° C. was measured according to JIS K6767:1999 (dimensional stability at high temperature: Method B). It is noted that "○" was for the result obtained when the heat shrinking was within ±0.5% and "x" was for the result obtained when the heat shrinking falls below −0.5% or exceeds 0.5%.

(Amount of Br)

The amount of Br contained in the molded foam is measured by an order analytical method (thin-film method) using a Fluorescent X-ray Analyzer (RIX-2100 manufactured by Rigaku Corporation). More specifically, 2 to 3 g of the polystyrene foam is heat-pressed at 200° C. to 230° C., thereby preparing a film having a thickness of 0.1 mm to 1 mm, length of 5 cm and width of 5 cm. After measuring the weight of the film, the basis weight is calculated, C8H8 is set as a balanced component, and the amount of Br is then calculated from X-ray intensity by the order analytical method.

TABLE 3

| | | | | Example | | | | | | |
|---|---|---|---|---|---|---|---|---|---|---|
| | | | | 11 | 12 | 13 | 14 | 15 | 16 | 17 |
| Impregnation | Flame-retardant solution | Plasticizer | (part by weight) | 100 | 100 | 100 | 100 | 100 | 100 | 100 |
| | | Flame retardant | (part by weight) | 183 | 150 | 283 | 183 | 183 | 183 | 183 |
| | | Flame retardant aid | (part by weight) | 58 | 58 | 58 | 58 | 58 | 58 | 58 |
| | | Aqueous medium | (part by weight) | 833 | 833 | 833 | 833 | 833 | 833 | 833 |
| | | Surfactant | (part by weight) | 2.5 | 2.5 | 2.5 | 2.5 | 2.5 | 2.5 | 2.5 |
| | | Hardly water-soluble inorganic salt | (part by weight) | 46.7 | 46.7 | 46.7 | 46.7 | 46.7 | 46.7 | 46.7 |
| | Resin particles | Amount of flame retardant | (part by weight) | 1.1 | 0.9 | 1.7 | 1.1 | 1.1 | 1.1 | 1.1 |
| | | Amount of flame retardant aid | (part by weight) | 0.35 | 0.35 | 0.35 | 0.35 | 0.35 | 0.35 | 0.35 |
| | Temperature of impregnating with blowing agent | | ° C. | 95 | 95 | 95 | 93 | 98 | 95 | 95 |
| | Flame retardant aggregates | | g | 0 | 0 | 0 | 0 | 0 | 0 | 0 |
| Flame retardant A | TBCO | | (part by weight) | 99.5 | 99.5 | 99.5 | 99.5 | 99.5 | 99.5 | 99.5 |
| | Silica | | (part by weight) | 0.5 | 0.5 | 0.5 | 0.5 | 0.5 | 0.5 | 0.5 |
| | Blocking evaluation of flame retardant A | | | ○ | ○ | ○ | ○ | ○ | ○ | ○ |
| Evaluation | Flame retardant test | Flame-out time | (sec) | 1.5 | 1.8 | 1.0 | 1.5 | 1.5 | 1.5 | 1.5 |
| | | Comprehensive evaluation | | ○ | ○ | ◎ | ○ | ○ | ○ | ○ |
| | Average chord length | | (μm) | 140 | 160 | 130 | 200 | 90 | 145 | 145 |
| | Appearance evaluation of foam | | | ○ | ○ | ○ | ○ | ○ | ○ | ○ |
| | Heat conductivity | | (W/m·K) | 0.036 | 0.036 | 0.037 | 0.037 | 0.037 | 0.036 | 0.036 |
| Particle diameter of resin particles | CV value | | (%) | 6.74% | 6.74% | 6.74% | 6.74% | 6.74% | 9.31% | 6.09% |
| | Particle diameter | | (mm) | 0.936 | 0.936 | 0.936 | 0.936 | 0.936 | 0.962 | 0.912 |

TABLE 3-continued

|  |  | Example | | | | | | |
|---|---|---|---|---|---|---|---|---|
|  |  | 11 | 12 | 13 | 14 | 15 | 16 | 17 |
| Heat resistance | (%) | −0.3 | −0.3 | −0.4 | −0.5 | −0.5 | −0.3 | −0.3 |
| Amount of Br | (%) | 0.72 | 0.59 | 1.1 | 0.72 | 0.74 | 0.71 | 0.77 |

TABLE 4

|  |  |  |  | Comparative Example | | | | |
|---|---|---|---|---|---|---|---|---|
|  |  |  |  | 8 | 9 | 10 | 11 | 12 |
| Impregnation | Flame-retardant solution | Plasticizer | (part by weight) | 100 | 100 | 100 | 100 | 100 |
|  |  | Flame retardant | (part by weight) | 183 | 33 | 500 | 183 | 183 |
|  |  | Flame retardant aid | (part by weight) | 58 | 58 | 58 | 58 | 58 |
|  |  | Aqueous medium | (part by weight) | 833 | 833 | 833 | 833 | 833 |
|  |  | Surfactant | (part by weight) | 2.5 | 2.5 | 2.5 | 2.5 | 2.5 |
|  |  | Hardly water-soluble inorganic salt | (part by weight) | 46.7 | 46.7 | 46.7 | 46.7 | 46.7 |
|  | Resin particles | Amount of flame retardant | (part by weight) | 1.1 | 0.2 | 3 | 1.1 | 1.1 |
|  |  | Amount of flame retardant aid | (part by weight) | 0.35 | 0.35 | 0.35 | 0.35 | 0.35 |
|  | Temperature of impregnating with blowing agent | | °C. | 95 | 95 | 95 | 80 | 110 |
|  | Flame retardant aggregates | | g | 0 | 0 | 0 | 0 | 0 |
| Flame retardant A | TBCO | | (part by weight) | 99.5 | 99.5 | 99.5 | 99.5 | 99.5 |
|  | Silica | | (part by weight) | 0.5 | 0.5 | 0.5 | 0.5 | 0.5 |
|  | Blocking evaluation of flame retardant A | | | ○ | ○ | ○ | ○ | ○ |
| Evaluation | Flame retardant test | Flame-out time | (sec) | 1.5 | Burning | 0.7 | 1.5 | 1.5 |
|  |  | Comprehensive evaluation | | ○ | X | ⊚ | ○ | ○ |
|  | Average chord length | | (μm) | 75 | 160 | 25 | 480 | 25 |
|  | Appearance evaluation of foam | | | X | ○ | X | X | X |
|  | Heat conductivity | | (W/m · K) | 0.037 | 0.036 | 0.037 | 0.036 | 0.037 |
| Particle diameter of resin particles | CV value | | (%) | 20.80% | 6.74% | 6.74% | 6.74% | 6.74% |
|  | Particle diameter | | (mm) | 0.984 | 0.936 | 0.936 | 0.936 | 0.936 |
| Heat resistance |  |  | (%) | −0.3 | −0.4 | −0.7 | −0.6 | −0.7 |
| Amount of Br |  |  | (%) | 0.56 | 0.049 | 1.9 | 0.73 | 0.66 |

Example 18

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and further, the temperature inside the autoclave was raised up to 120° C. and maintained at 120° C. for two hours, thereby carrying out suspension polymerization of the styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining polystyrene particles having a particle diameter of 0.6 to 0.85 mm and a weight average molecular weight of 300,000.

Next, 30 kg of ion-exchange water, 4 g of sodium dodecylbenzenesulfonate and 100 g of magnesium pyrophosphate were supplied to another autoclave having 100 litters equipped with a stirrer, followed by supplying 11 kg of the above polystyrene particles as seed particles into the autoclave and stirring them to be uniformly dispersed in water.

Additionally, while a dispersion liquid was prepared by dispersing 2 g of sodium dodecylbenzenesulfonate and 20 g of magnesium pyrophosphate in 6 kg of ion-exchange water, a styrene monomer solution was prepared by dissolving 132 g of benzoyl peroxide (having a 75% by weight purity) and 50 g of t-butylperoxy-2-ethylhexyl monocarbonate, which are polymerization initiators, in 5 kg of styrene monomer. This styrene monomer solution was added to the above dispersion liquid. The mixture was stirred with a homomixer and then emulsified, thereby obtaining an emulsion.

After the temperature inside the autoclave was heated to and maintained at 75° C., the above emulsion was added into the autoclave and the temperature was maintained for 30 minutes so as to smoothly absorb the styrene monomer and benzoyl peroxide into the polystyrene seed particles. After that, while the temperature inside the autoclave was raised from 75° C. to 108° C. at a temperature rise rate of 0.2° C. per minute, 28 kg of styrene monomer was continuously dropped into the autoclave for 160 minutes. Next, 20 minutes after completing the dropping of the styrene monomer, the temperature was raised up to 120° C. at a temperature rise rate of 1° C. per minute and maintained for 90 minutes, and therefore, polystyrene particles were obtained by seed polymerization. Moreover, all of the styrene monomer was used in polymerization.

Moreover, a flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

6 g of sodium dodecylbenzenesulfonate and 112 g of magnesium pyrophosphate obtained by a metathesis method were supplied to 2 kg of ion exchange water and they were stirred. Then, while being heated to and maintained at 50° C., 350 g of isobutyl adipate (DIBA) (trade name "DI4A" manufactured by Taoka Chemical Co., Ltd.) as a plasticizer, 310 g of the flame retardant A and 130 g of a flame retardant aid, dicumyl peroxide were added to the above ion exchange water and stirred with a homomixer (T.K. Homomixer, MARKII f model, manufactured by Tokushu Kika Kogyo Kabushiki Kaisha) at 7000 rpm for 30 minutes. Then, the flame retardant A and the flame retardant aid were completely dissolved therein to form a flame-retardant solution, and right after that, this flame-retardant solution was dispersed in the ion exchange water, thereby forming dispersions of the flame-retardant solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) was pressed into the autoclave under nitrogen pressure as a blowing agent for 30 minutes and the temperature inside the autoclave was raised up to the temperature as shown in "Temperature of impregnating with blowing agent" of Table 5 and maintained at that temperature for two and a half hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.90 mm to 1.40 mm and an average particle diameter of 1.1 mm. It is noted that the flame-retardant solution was entirely impregnated into the polystyrene particles.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Example 19

Expandable polystyrene particles were obtained as in Example 18 except that the amount of the flame retardant A was 180 g instead of 310 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Example 20

Expandable polystyrene particles were obtained as in Example 18 except that the amount of the flame retardant A was 660 g instead of 310 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Example 21

Expandable polystyrene particles were obtained as in Example 18 except that the temperature of impregnating with the blowing agent was set at 97° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Example 22

Expandable polystyrene particles were obtained as in Example 18 except that the temperature of impregnating with the blowing agent was set at 103° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Example 23

Expandable polystyrene particles were obtained as in Example 18 except that dibutyl sebacate was used as a plasticizer instead of isobutyl adipate.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also good appearance.

Comparative Example 13

Expandable polystyrene particles were obtained as in Example 18 except that the amount of the flame retardant A was 130 g instead of 310 g. Therefore, non-uniform absorption of the flame retardant occurred and concavities and convexities were observed in fused parts between the expanded particles of the molded foam.

Comparative Example 14

Expandable polystyrene particles were obtained as in Example 19 except that the amount of the flame retardant A was 1300 g instead of 310 g. When the average chord length of the obtained molded foam was measured, cell fineness was observed because the flame retardant was used in a large amount. Therefore, concavities and convexities were observed in fused parts between the expanded particles of the molded foam.

Comparative Example 15

Expandable polystyrene particles were obtained as in Example 18 except that the temperature of impregnating with the blowing agent was set at 80° C. instead of 100° C. When the average chord length of the obtained molded foam was measured, it was 160 μm and the appearance of the foam was deteriorated. Therefore, concavities and convexities were observed in fused parts between the expanded particles of the molded foam.

Comparative Example 16

Expandable polystyrene particles were obtained as in Example 19 except that the temperature of impregnating with the blowing agent was set at 120° C. instead of 100° C. When the average chord length of the obtained molded foam was measured, it was 15 μm and therefore, concavities and convexities were observed in fused parts between the expanded particles of the molded foam.

Comparative Example 17

Expandable polystyrene particles were obtained as in Example 18 except that dimethyl phthalate (DMP) (SP value=10.7) was used as a plasticizer instead of the di-isobutyl adipate. However, when the obtained expandable polystyrene particles were pre-expanded, a lot of deposits adhered to the can wall in a pre-expander were generated, and the amount of blocking with the expanded particles coalesced was higher. As a result, a molded foam could not be obtained.

Comparative Example 18

Expandable polystyrene particles were obtained as in Example 18 except that liquid paraffin (SP value=7.5) was used as a plasticizer instead of di-isobutyl adipate. However, when the obtained expandable polystyrene particles were pre-expanded, many deposits adhered to the can wall in a pre-expander were generated, and the amount of blocking with the expanded particles coalesced was higher. As a result, a molded foam could not be obtained.

(Method for Measuring Silica Specific Surface Area)

All methods of measuring the specific surface area of the silica fine powders used in the present invention are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it Δ . . . The flame retardant is hardened in a hard state, but crumbled when grasping it.

○ . . . The flame retardant is of firm texture, but there are no lumps and it is in a powder state.

With regard to the obtained expandable polystyrene particles, pre-expandability, expansion moldability, flame retardancy and an average chord length of cells in the molded foam were measured by the following methods and the obtained results were shown in Table 5.

(Pre-Expandability)

40000 g of the obtained expandable polystyrene particles and as top coating agents, 20 g of polyethylene glycol, 60 g of zinc stearate, 40 g of 1,2-hydroxystearic acid triglyceride (trade name "K-3 Wax 500" manufactured by Kawaken Fine Chemicals Co., Ltd.) and 20 g of stearic acid monoglyceride (trade name "RIKEMAL S-100P" manufactured by RIKEN VITAMIN CO., LTD.) were supplied into a tumbler mixer and stirred for 30 minutes, thereby coating the surfaces of the expandable polystyrene particles with the top coating agents.

Next, after the expandable polystyrene particles were stored in a cooling warehouse having 15° C. for 48 hours, 625 g of the expandable polystyrene particles were supplied into a pre-expander equipped with a stirrer and pre-expanded by heating with water vapor, thereby obtaining pre-expanded particles with 40 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

The appearance of the molded foam was visually observed and evaluated according to the following standard.

○ . . . The fused parts between the expanded particles were flat and smooth.

x . . . Concavities and convexities were generated in the fused parts of the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 5 and 6. According to the JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

◯ . . . Flame-out time is within three seconds and in all of the five test specimens, afterglow does not exist, nor does flame spread beyond an indicating line of flammability limit.

◉ . . . Flame-out time is within one second and in all of the five test specimens, afterglow does not exist, nor does flame spread beyond an indicating line of flammability limit.

(Average Chord Length)

The average chord length of the molded foam is obtained by measuring according to the test method for ASTM D2842-69. Specifically, the molded foam is cut into substantially two equal parts and the cut surface is photographed at a magnification of 100 times by using a scanning Electron Microscope (trade name "S-3000N" manufactured by Hitachi, Ltd.). The photographed image is printed onto A4 paper, at an arbitrary position of which a 60 mm long straight line is drawn. From the number of cells which are present on this straight line, the average chord length (t) of cells is calculated by the following formula.

Average chord length $t=60/($number of cells$\times$magnification ratio of photograph$)$ In drawing a straight line, when the straight line comes into point contact with the cells, these cells are also included in the number of cells as much as possible. Further, when both ends of the straight line are located within cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

TABLE 5

| | | | | Example | | | | | |
|---|---|---|---|---|---|---|---|---|---|
| | | | | 18 | 19 | 20 | 21 | 22 | 23 |
| Impregnation | Flame-retardant solution | Type of plasticizer | | DIBA | DIBA | DIBA | DIBA | DIBA | DBS |
| | | Plasticizer | (part by weight) | 100 | 100 | 100 | 100 | 100 | 100 |
| | | Flame retardant | (part by weight) | 89 | 51 | 189 | 189 | 189 | 89 |
| | | Flame retardant aid | (part by weight) | 58 | 58 | 58 | 58 | 58 | 58 |
| | | Aqueous medium | (part by weight) | 833 | 833 | 833 | 833 | 833 | 833 |
| | | Surfactant | (part by weight) | 2.5 | 2.5 | 2.5 | 2.5 | 2.5 | 2.5 |
| | | Hardly water-soluble inorganic salt | (part by weight) | 46.7 | 46.7 | 46.7 | 46.7 | 46.7 | 46.7 |
| | Resin particles | Amount of flame retardant | (part by weight) | 0.7 | 0.4 | 1.5 | 0.7 | 0.7 | 0.7 |
| | | Amount of flame retardant aid | (part by weight) | 0.30 | 0.30 | 0.30 | 0.30 | 0.30 | 0.30 |
| | Temperature of impregnating with blowing agent | | °C. | 100 | 100 | 100 | 97 | 103 | 100 |
| | Flame retardant aggregates | | g | 0 | 0 | 0 | 0 | 0 | 0 |
| Flame retardant A | TBCO | | (part by weight) | 99.5 | 99.5 | 99.5 | 99.5 | 99.5 | 99.5 |
| | Silica | | (part by weight) | 0.5 | 0.5 | 0.5 | 0.5 | 0.5 | 0.5 |
| | Blocking evaluation of flame retardant A | | | ◯ | ◯ | ◯ | ◯ | ◯ | ◯ |
| Evaluation | Flame retardant test | Flame-out time | (sec) | 1.0 | 1.2 | 0.8 | 1.0 | 1.0 | 1.0 |
| | | Comprehensive evaluation | | ◯ | ◯ | ◉ | ◯ | ◯ | ◯ |
| | Average chord length | | (μm) | 60 | 140 | 40 | 65 | 45 | 65 |
| | Appearance evaluation of foam | | | ◯ | ◯ | ◯ | ◯ | ◯ | ◯ |

TABLE 6

| | | | | Comparative Example | | | | | |
|---|---|---|---|---|---|---|---|---|---|
| | | | | 13 | 14 | 15 | 16 | 17 | 18 |
| Impregnation | Flame retardant solution | Type of plasticizer | | DIBA | DIBA | DIBA | DIBA | DMP | Liquid paraffin |
| | | Plasticizer | (part by weight) | 100 | 100 | 100 | 100 | 100 | 100 |
| | | Flame retardant | (part by weight) | 37 | 371 | 89 | 89 | 89 | 89 |
| | | Flame retardant aid | (part by weight) | 58 | 58 | 58 | 58 | 58 | 58 |
| | | Aqueous medium | (part by weight) | 833 | 833 | 833 | 833 | 833 | 833 |
| | | Surfactant | (part by weight) | 2.5 | 2.5 | 2.5 | 2.5 | 2.5 | 2.5 |
| | | Hardly water-soluble inorganic salt | (part by weight) | 46.7 | 46.7 | 46.7 | 46.7 | 46.7 | 46.7 |
| | Resin particles | Amount of flame retardant | (part by weight) | 0.3 | 3.0 | 0.7 | 0.7 | 0.7 | 0.7 |
| | | Amount of flame retardant aid | (part by weight) | 0.3 | 0.3 | 0.3 | 0.3 | 0.3 | 0.3 |
| | Temperature of impregnating with blowing agent | | °C. | 100 | 100 | 80 | 120 | 100 | 100 |
| | Flame retardant aggregates | | g | 0 | 0 | 0 | 0 | 0 | 0 |
| Flame retardant A | TBCO | | (part by weight) | 99.5 | 99.5 | 99.5 | 99.5 | 99.5 | 99.5 |
| | Silica | | (part by weight) | 0.5 | 0.5 | 0.5 | 0.5 | 0.5 | 0.5 |
| | Blocking evaluation of flame retardant A | | | ◯ | ◯ | ◯ | ◯ | ◯ | ◯ |
| Evaluation | Flame retardant test | Flame-out time | (sec) | Burning | 0.3 | 1.0 | 1.0 | Not evaluated | Not evaluated |
| | | Comprehensive evaluation | | X | ◉ | ◯ | ◯ | Not evaluated | Not evaluated |
| | Average chord length | | (μm) | 85 | 15 | 160 | 15 | Not evaluated | Not evaluated |
| | Appearance evaluation of foam | | | ◯ | X | X | X | Not evaluated | Not evaluated |

Example 24

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and the temperature inside the autoclave was further raised up to 120° C. and maintained at 120° C. for two hours, thereby carrying out suspension polymerization of the styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining polystyrene particles having a particle diameter of 0.2 to 0.8 mm and a weight average molecular weight of 240,000.

Next, 35 kg of ion-exchange water, 4 g of sodium dodecylbenzenesulfonate and 200 g of magnesium pyrophosphate were supplied to another autoclave having 100 litters equipped with a stirrer, followed by supplying 8000 g of the above polystyrene particles as seed particles into the autoclave and stirring them to be uniformly dispersed in water.

Besides the above, while a dispersant obtained by dissolving 3 g of sodium dodecylbenzenesulfonate in 5 kg of ion-exchange water was prepared, a styrene-based monomer solution was prepared by dissolving 100 g of 2,5-dimethyl-2,5-di(benzoyl peroxide) hexane (ten-hour half-life temperature: 100° C.) and 100 g of dicumyl peroxide (ten-hour half-life temperature: 116° C.), which are polymerization initiators, in 1994 g of styrene, 500 g of α-methyl styrene and 6 g of divinylbenzene. This styrene-based monomer solution was added to the above dispersion liquid and stirred with a homomixer, and the mixture was then emulsified, thereby obtaining an emulsion.

After the temperature inside the autoclave was heated to and maintained at 80° C., the above emulsion was added into the autoclave and the temperature was maintained for 30 minutes so as to smoothly absorb the styrene, α-methyl styrene, divinylbenzene and the polymerization initiators into the polystyrene seed particles. After that, the temperature inside the autoclave was raised from 80° C. to 118° C. at a temperature rise rate of 1° C. per minute. When the temperature reaches 118° C., 22000 g of styrene and 7500 g of α-methyl styrene were continuously dropped into the autoclave for 480 minutes. Next, 60 minutes after completing the dropping of the styrene monomer, the temperature was raised up to 140° C. at a temperature rise rate of 1° C. per minute and maintained for 120 minutes, and therefore, polystyrene particles were obtained by seed polymerization. All of the styrene, α-methyl styrene, and divinylbenzene were used in polymerization.

A flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

Furthermore, 6 g of sodium dodecylbenzenesulfonate and 112 g of magnesium pyrophosphate obtained by a metathesis method were supplied to 2 kg of ion exchange water and they were stirred. Then, while it was heated to and maintained at 50° C., 240 g of styrene as a plasticizer, 440 g of the flame retardant A and 140 g of a flame retardant aid, dicumyl peroxide were added into the above ion exchange water and the mixture was stirred with a homomixer ("T.K. Homomixer, MARKII f model" manufactured by Tokushu Kika Kogyo Kabushiki Kaisha) at 7000 rpm for 30 minutes. Then, the flame retardant A and the flame retardant aid were completely dissolved therein to form a flame-retardant solution, and right after that, this flame-retardant solution was dispersed in the ion exchange water, thereby forming dispersions of the flame-retardant solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) and 1600 g of pentane (iso-pentane/n-pentane (weight ratio)=20/80) were pressed into the autoclave under nitrogen pressure for 30 minutes and the temperature inside the autoclave was raised up to the temperature as shown in "Temperature of impregnating with blowing agent" of Table 7 and maintained at the temperature for four hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.50 to 1.0 mm and an average particle diameter of 0.75 mm. It is noted that the flame-retardant solution was entirely impregnated into the polystyrene particles.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 25

Expandable polystyrene particles were obtained as in Example 24 except that the amount of the flame retardant A was 360 g instead of 440 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 26

Expandable polystyrene particles were obtained as in Example 24 except that the amount of the flame retardant A was 680 g instead of 440 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 27

Expandable polystyrene particles were obtained as in Example 24 except that the temperature of impregnating with the blowing agent was set at 97° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 28

Expandable polystyrene particles were obtained as in Example 24 except that the temperature of impregnating with the blowing agent was set at 103° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 29

Expandable polystyrene particles were obtained as in Example 24 except that expandable polystyrene resin particles having a CV value of 9.2% were used.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Example 30

Expandable polystyrene particles were obtained as in Example 24 except that expandable polystyrene resin particles having a CV value of 6.2% were used.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had excellent heat insulation property and also excellent heat resistance such that when it was heated at 90° C. for 168 hours, heat shrinking before and after heating was within ±0.5%.

Comparative Example 19

When expandable polystyrene resin particles having a CV value of 21.00% were used, the filling property of pre-expanded particles during molding is poor, so that a molded foam could not be obtained.

Comparative Example 20

Expandable polystyrene particles were obtained as in Example 24 except that the amount of the flame retardant A was 80 g instead of 440 g. For this reason, non-uniform absorption of the flame retardant occurred and concavities and convexities were observed in fused parts between the expanded particles of the molded foam.

Comparative Example 21

Expandable polystyrene particles were obtained as in Example 24 except that the amount of the flame retardant A was 1200 g instead of 440 g. When the average chord length of the obtained molded foam was measured, cell fineness was observed because the flame retardant was used in a large amount. For this reason, concavities and convexities were observed in fused parts between the expanded particles of the molded foam.

Comparative Example 22

Expandable polystyrene particles were obtained as in Example 24 except that the temperature of impregnating with the blowing agent was set at 85° C. instead of 100° C. When the average chord length of the obtained molded foam was measured, it was 450 μm and the heat insulation property was poor.

Comparative Example 23

Expandable polystyrene particles were obtained as in Example 24 except that the temperature of impregnating with the blowing agent was set at 115° C. instead of 100° C. When the average chord length of the obtained molded foam was measured, it was 25 μm and the heat insulation property was poor.

(Method for Measuring Average Particle Diameter)

Using a Ro-tap type sieve shaker (manufactured by Iida Seisakusho Co. Ltd.), about 50 to 100 g of specimens were classified for ten minutes with a JIS standard sieve of 4.00 mm sieve aperture, 3.35 mm aperture, 2.80 mm aperture, 2.36 mm aperture, 2.00 mm aperture, 1.70 mm aperture, 1.40 mm aperture, 1.18 mm aperture, 1.00 mm aperture, 0.85 mm aperture, 0.71 mm aperture, 0.60 mm aperture, 0.50 mm aperture, 0.425 mm aperture, 0.355 mm aperture, 0.300 mm aperture, 0.250 mm aperture, 0.212 mm aperture, 0.180 mm aperture. The weights of the specimens on a sieve mesh were measured and from the result, a cumulative weight distribution curve was obtained. The particle diameter whose cumulative weight is 50% (median diameter) based on the cumulative weight distribution curve is called an average particle diameter.

(Method for Measuring Coefficient of Variation (CV Value) of the Diameter of Polystyrene Resin Particles)

A coefficient of variation (CV value) of the diameter of the polystyrene resin particles is the value calculated by substituting a standard deviation (δ) of the particle diameter and an average particle diameter (x) into the following formula.

$$CV\ value(\%) = (\delta/x) \times 100$$

(Method for Measuring Silica Specific Surface Area)

All methods of measuring the specific surface area of the silica fine powders used in the present invention are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it.

Δ . . . The flame retardant is hardened in a hard state, but crumbled when grasping it.

○ . . . The flame retardant is of firm texture, but there are no lumps, and it is in a powder state.

With regard to the obtained expandable polystyrene particles, the pre-expandability, expansion moldability, flame retardancy and an average chord length of the cells in the molded foam were measured by the following methods and the obtained results were shown in Table 7.

(Pre-Expandability)

40000 g of the obtained expandable polystyrene particles and as top coating agents, 20 g of polyethylene glycol, 60 g of zinc stearate, 40 g of 12-hydroxystearic acid triglyceride (trade name "K-3 Wax 500" manufactured by Kawaken Fine Chemicals Co., Ltd.) and 20 g of stearic acid monoglyceride (trade name "RIKEMAL S-100P" manufactured by RIKEN VITAMIN CO., LTD.) were supplied into a tumbler mixer and stirred for 30 minutes, thereby coating the surfaces of the expandable polystyrene particles with the top coating agents.

Next, after the expandable polystyrene particles were stored in a cooling warehouse having 15° C. for 48 hours, 500 g of the expandable polystyrene particles were supplied into a pre-expander equipped with a stirrer and pre-expanded by heating with water vapor, thereby obtaining pre-expanded particles with 50 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

Appearance of the molded foam was visually observed and evaluated according to the following standard.

○ . . . The fused parts between the expanded particles were flat and smooth.

x . . . Concavities and convexities were generated in the fused parts between the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 7 and 8. According to the above JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

○ . . . Flame-out time is within three seconds and in all of the five test specimens, afterglow does not exist, nor does flame spread beyond an indicating line of flammability limit.

◉ . . . Flame-out time is within one second and in all of the five test specimens, afterglow does not exist, nor does flame spread beyond an indicating line of flammability limit.

(Average Chord Length)

The average chord length of the molded foam is obtained by measuring according to the test method for ASTM D2842-69. Specifically, the molded foam is cut into substantially two equal parts and the cut surface is photographed at a magnification of 100 times using a scanning Electron Microscope (trade name "S-3000N" manufactured by Hitachi, Ltd.). The photographed image is printed onto A4 paper, at an arbitrary position of which a 60 mm long straight line is drawn. The average chord length (t) of cells is calculated from the number of cells that are present on this straight line by the following formula.

$$\text{Average chord length } t = 60/(\text{number of cells} \times \text{magnification ratio of photograph})$$

In drawing a straight line, when the straight line comes into point contact with the cells, these cells are also included in the number of cells as much as possible. Further, when both ends of the straight line are located within the cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

(Heat Conductivity)

From the molded foam, a test specimen having a rectangular parallelepiped shape of 200 mm length×200 mm width× 10 to 25 mm height was cut out.

Using measuring equipment commercially available from EKO Instruments Co., Ltd. under the trade name "HC-074/200", a low-temperature plate of the measuring equipment was set lower by 15° C. than the average temperature of the test specimen and a high-temperature plate thereof was set higher by 15° C. than the average temperature of the test specimen, followed by measuring the heat conductivity of the test specimen according to the method as described in JIS A 1412-2:1999 "Measuring Method for Heat Resistance and Heat Conductivity of Heat Insulators—Part 2: Heat flow meter method (HFM method)". It is noted that the average temperature of the test specimens was defined as 0, 20, and 30° C. Based on the obtained heat conductivity, a regression line with the abscissa axis representing temperature and the ordinate axis representing heat conductivity was drawn and the heat conductivity of the test specimen at 23° C. was calculated.

With regard to an extrusion method polystyrene standard plate (NIST-SRM1453) from U.S. National Institute of Standards and Technology, its heat conductivity was measured by the same method as described above. With the heat conductivity of the extrusion method polystyrene standard plate and the nominal value thereof (calculated value at 23° C.), a correction of the measuring equipment was performed by the following formula, thereby defining the corrected value as heat conductivity of the test specimen.

Heat conductivity $\lambda(W/m \cdot K)$=Heat conductivity of test specimen at 23° C.×nominal value of extrusion method polystyrene standard plate (calculated value at 23° C.)/Heat conductivity of extrusion method polystyrene standard plate at 23° C.

(Heat Resistance)

From the molded foam, a test specimen having a rectangular parallelepiped shape of 120 mm length×120 mm width× 30 mm height was cut out. Heat shrinking of this test specimen after left at 90° C. for 168 hours was measured according to JIS K6767:1999 (dimensional stability at high temperature: Method B). It is noted that "◯" was for the result obtained when the heat shrinking was within ±0.5% and "x" was for the result obtained when the heat shrinking falls below −0.5% or exceeds 0.5%.

(Amount of Br)

The amount of Br contained in the molded foam is measured by an order analytical method (thin-film method) using a Fluorescent X-ray Analyzer (RIX-2100 manufactured by Rigaku Corporation). More specifically, 2 to 3 g of the polystyrene foam is heat-pressed at 200° C. to 230° C., thereby preparing a film having a thickness of 0.1 mm to 1 mm, length of 5 cm and width of 5 cm. After measuring the weight of the film, the basis weight is calculated, $C_8H_8$ is set as a balanced component, and the amount of Br is then calculated from X-ray intensity by the order analytical method.

TABLE 7

| | | | | Example | | | | | | |
|---|---|---|---|---|---|---|---|---|---|---|
| | | | | 24 | 25 | 26 | 27 | 28 | 29 | 30 |
| Impregna- tion | Flame retardant solution | Plasticizer | (part by weight) | 100 | 100 | 100 | 100 | 100 | 100 | 100 |
| | | Flame retardant A | (part by weight) | 183 | 150 | 283 | 183 | 183 | 183 | 183 |
| | | Flame retardant aid | (part by weight) | 58 | 58 | 58 | 58 | 58 | 58 | 58 |
| | | Aqueous medium | (part by weight) | 833 | 833 | 833 | 833 | 833 | 833 | 833 |
| | | Surfactant | (part by weight) | 2.5 | 2.5 | 2.5 | 2.5 | 2.5 | 2.5 | 2.5 |
| | | Hardly water-soluble inorganic salt | (part by weight) | 46.7 | 46.7 | 46.7 | 46.7 | 46.7 | 46.7 | 46.7 |
| | Resin particles | Amount of flame retardant | (part by weight) | 1.1 | 0.9 | 1.7 | 1.1 | 1.1 | 1.1 | 1.1 |
| | | Amount of flame retardant aid | (part by weight) | 0.35 | 0.35 | 0.35 | 0.35 | 0.35 | 0.35 | 0.35 |
| | Temperature of impregnating with blowing agent | | ° C. | 100 | 100 | 100 | 97 | 103 | 100 | 100 |
| | Flame retardant aggregates | | g | 0 | 0 | 0 | 0 | 0 | 0 | 0 |
| Flame retardant A | TBCO | | (part by weight) | 99.5 | 99.5 | 99.5 | 99.5 | 99.5 | 99.5 | 99.5 |
| | Silica | | (part by weight) | 0.5 | 0.5 | 0.5 | 0.5 | 0.5 | 0.5 | 0.5 |
| | Blocking evaluation of flame retardant A | | | ◯ | ◯ | ◯ | ◯ | ◯ | ◯ | ◯ |
| Evaluation | Flame retardant test | Flame-out time | (second) | 1.5 | 1.8 | 1.0 | 1.5 | 1.5 | 1.5 | 1.5 |
| | | Comprehensive evaluation | | ◯ | ◯ | ◉ | ◯ | ◯ | ◯ | ◯ |
| | Average chord length | | (μm) | 50 | 80 | 50 | 200 | 65 | 170 | 170 |
| | Appearance evaluation of foam | | | ◯ | ◯ | ◯ | ◯ | ◯ | ◯ | ◯ |
| | Heat conductivity | | (W/m · K) | 0.034 | 0.034 | 0.034 | 0.035 | 0.035 | 0.034 | 0.034 |
| Particle diameter of resin particles | CV value | | (%) | 7.20% | 7.20% | 7.20% | 7.20% | 7.20% | 9.20% | 6.20% |
| | Particle diameter | | (mm) | 0.752 | 0.752 | 0.752 | 0.752 | 0.752 | 0.721 | 0.7608 |
| Heat resistance | | | (%) | −0.3 | −0.3 | −0.4 | −0.5 | −0.5 | −0.3 | −0.3 |
| Amount of Br | | | (%) | 0.66 | 0.54 | 1.02 | 0.66 | 0.66 | 0.66 | 0.66 |

TABLE 8

| | | | | Comparative Example | | | | |
|---|---|---|---|---|---|---|---|---|
| | | | | 19 | 20 | 21 | 22 | 23 |
| Impregnation | Flame retardant solution | Plasticizer | (part by weight) | 100 | 100 | 100 | 100 | 100 |
| | | Flame retardant A | (part by weight) | 183 | 33 | 500 | 183 | 183 |
| | | Flame retardant aid | (part by weight) | 58 | 58 | 58 | 58 | 58 |
| | | Aqueous medium | (part by weight) | 833 | 833 | 833 | 833 | 833 |
| | | Surfactant | (part by weight) | 2.5 | 2.5 | 2.5 | 2.5 | 2.5 |
| | | Hardly water-soluble inorganic salt | (part by weight) | 46.7 | 46.7 | 46.7 | 46.7 | 46.7 |
| | Resin particles | Amount of flame retardant | (part by weight) | 1.1 | 0.2 | 3 | 1.1 | 1.1 |
| | | Amount of flame retardant aid | (part by weight) | 0.35 | 0.35 | 0.35 | 0.35 | 0.35 |
| | Temperature of impregnating with blowing agent | | °C. | 100 | 100 | 100 | 85 | 115 |
| | Flame retardant aggregates | | g | 0 | 0 | 0 | 0 | 0 |
| Flame retardant A | TBCO | | (part by weight) | 99.5 | 99.5 | 99.5 | 99.5 | 99.5 |
| | Silica | | (part by weight) | 0.5 | 0.5 | 0.5 | 0.5 | 0.5 |
| | Blocking evaluation of flame retardant A | | | ○ | ○ | ○ | ○ | ○ |
| Evaluation | Flame retardant test | Flame-out time | (sec) | 1.5 | Burning | 0.7 | 1.5 | 1.5 |
| | | Comprehensive evaluation | | ○ | X | ◎ | ○ | ○ |
| | Average chord length | | (μm) | Not evaluated | 300 | 25 | 450 | 25 |
| | Appearance evaluation of foam | | | X | ○ | X | X | X |
| | Heat conductivity | | (W/m · K) | 0.034 | 0.034 | 0.037 | 0.036 | 0.037 |
| Particle diameter of resin particles | CV value | | (%) | 21.00% | 7.20% | 7.20% | 7.20% | 7.20% |
| | Particle diameter | | (mm) | 0.961 | 0.752 | 0.752 | 0.752 | 0.752 |
| Heat resistance | | | (%) | Not evaluated | −0.4 | −0.6 | −0.6 | −0.7 |
| Amount of Br | | | (%) | Not evaluated | 0.051 | 1.8 | 0.66 | 0.66 |

Example 31

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and the temperature inside the autoclave was further raised up to 120° C. and maintained at 120° C. for two hours, thereby carrying out suspension polymerization of the styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining the polystyrene particles having a particle diameter of 0.6 to 0.85 mm and a weight average molecular weight of 300,000.

Next, 30 kg of ion-exchange water, 4 g of sodium dodecylbenzenesulfonate and 100 g of magnesium pyrophosphate were supplied to another autoclave having 100 litters equipped with a stirrer, followed by supplying 11 kg of the above polystyrene particles as seed particles into the autoclave and stirring them to be uniformly dispersed in water.

Additionally, while a dispersion liquid was prepared by dispersing 2 g of sodium dodecylbenzenesulfonate and 20 g of magnesium pyrophosphate in 6 kg of ion-exchange water, a styrene monomer solution was prepared by dissolving 132 g of benzoyl peroxide (having a 75% by weight purity) and 50 g of t-butylperoxy-2-ethylhexyl monocarbonate, which are polymerization initiators, in 5 kg of styrene monomer. This styrene monomer solution was added to the above dispersion liquid. The mixture was stirred with a homomixer, and then emulsified, thereby obtaining an emulsion.

After the temperature inside the autoclave was heated to and maintained at 75° C., the above emulsion was added into the autoclave and the temperature was maintained for 30 minutes so as to smoothly absorb the styrene monomer and benzoyl peroxide into the polystyrene seed particles. After that, while the temperature inside the autoclave was raised from 75° C. to 108° C. at a temperature rise rate of 0.2° C. per minute, 28 kg of styrene monomer was continuously dropped into the autoclave for 160 hours. Next, 20 minutes after completing the dropping of the styrene monomer, the temperature was raised up to 120° C. at a temperature rise rate of 1° C. per minute and maintained at the temperature for 90 minutes, thereby obtaining polystyrene particles by seed polymerization. In addition, all of the styrene monomer was used in polymerization.

Moreover, a flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

Furthermore, 6 g of sodium dodecylbenzenesulfonate and 112 g of magnesium pyrophosphate obtained by a metathesis method were supplied to 2 kg of ion exchange water and they were stirred. Then, while being heated to and maintained at 50° C., 350 g of di-isobutyl adipate (DIBA) (trade name "DI4A" manufactured by Taoka Chemical Co., Ltd.) as a plasticizer, 310 g of the flame retardant A and 130 g of a flame retardant aid, dicumyl peroxide were added to the above ion exchange water and stirred with a homomixer (T.K. Homomixer, MARKII f model, manufactured by Tokushu Kika Kogyo Kabushiki Kaisha) at 7000 rpm for 30 minutes. Then, the flame retardant A and the flame retardant aid were completely dissolved therein to form a flame-retardant solution, and right after that, this flame-retardant solution was dispersed in the ion exchange water, thereby forming dispersions of the flame-retardant solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) was pressed into the autoclave under nitrogen pressure as a blowing agent for 30 minutes and the temperature inside the autoclave was raised up to 100° C. and maintained at the temperature for two and a half hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.9 to 1.4 mm and an average particle diameter of 1.1 mm. It is noted that the flame-retardant solution was entirely impregnated into the polystyrene particles.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 32

Expandable polystyrene particles were obtained as in Example 31 except that the amount of the flame retardant A was 180 g instead of 310 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 33

Expandable polystyrene particles were obtained as in Example 31 except that the amount of the flame retardant A was 660 g instead of 310 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 34

Expandable polystyrene particles were obtained as in Example 31 except that the temperature of impregnating with the blowing agent was set at 97° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 35

Expandable polystyrene particles were obtained as in Example 31 except that the temperature of impregnating with the blowing agent was set at 103° C. instead of 100° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount.

Example 36

Expandable polystyrene particles were obtained as in Example 31 except that butyl sebacate (DBS) was used as a plasticizer instead of the di-isobutyl adipate.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused part between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Comparative Example 24

Expandable polystyrene particles were obtained as in Example 31 except that the amount of the flame retardant A was 130 g instead of 310 g. Therefore, non-uniform absorption of the flame retardant occurred and concavities and convexities were observed in fused parts between the expanded particles of the molded foam.

Comparative Example 25

Expandable polystyrene particles were obtained as in Example 31 except that the amount of the flame retardant A was 1320 g instead of 310 g. When the average chord length of the obtained molded foam was measured, cell fineness was observed because the flame retardant was used in a large amount. Therefore, concavities and convexities were observed in fused parts between the expanded particles of the molded foam.

Comparative Example 26

Expandable polystyrene particles were obtained as in Example 31 except that the temperature of impregnating with the blowing agent was set at 80° C. instead of 100° C. When the average chord length of the obtained molded foam was measured, the average cell diameter was 300 µm and the appearance of the foam was deteriorated. Therefore, concavities and convexities were observed in fused parts between the expanded particles of the molded foam.

Comparative Example 27

Expandable polystyrene particles were obtained as in Example 31 except that the temperature of impregnating with the blowing agent was set at 120° C. instead of 100° C. When the average chord length of the obtained molded foam was measured, the average cell diameter was 30 µm and therefore, concavities and convexities were observed in fused parts between the expanded particles of the molded foam.

Comparative Example 28

Expandable polystyrene particles were obtained as in Example 31 except that dimethyl phthalate (SP value=10.7) was used as a plasticizer instead of the di-isobutyl adipate. However, when the obtained expandable polystyrene particles were pre-expanded, a lot of deposits adhered to the can wall in a pre-expander were generated, and the amount of blocking with the expanded particles coalesced was higher. As a result, a molded foam could not be obtained.

Comparative Example 29

Expandable polystyrene particles were obtained as in Example 31 except that liquid paraffin (SP value=7.5) was used as a plasticizer instead of the di-isobutyl adipate. However, when the obtained expandable polystyrene particles were pre-expanded, a lot of deposits adhered to the can wall in a pre-expander were generated, and the amount of blocking with the expanded particles coalesced was higher. As a result, a molded foam could not be obtained.

(Method for Measuring Average Diameter of Polystyrene Resin Particles)

Using a Ro-tap type sieve shaker (manufactured by Iida Seisakusho Co. Ltd.), about 50 to 100 g of specimens were classified for ten minutes with a JIS standard sieve of 4.00 mm sieve aperture, 3.35 mm aperture, 2.80 mm aperture, 2.36 mm aperture, 2.00 mm aperture, 1.70 mm aperture, 1.40 mm aperture, 1.18 mm aperture, 1.00 mm aperture, 0.85 mm aperture, 0.71 mm aperture, 0.60 mm aperture, 0.50 mm aperture, 0.425 mm aperture, 0.355 mm aperture, 0.300 mm aperture, 0.250 mm aperture, 0.212 mm aperture, 0.180 mm aperture. The weights of the specimens on a sieve mesh were measured and from the result, a cumulative weight distribution curve was obtained. The particle diameter whose cumulative weight is 50% (median diameter) based on the cumulative weight distribution curve is called the average particle diameter.

(Method for Measuring Silica Specific Surface Area)

All methods of measuring the specific surface area of the silica fine powders used in the present invention are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it A . . . The flame retardant is hardened in a hard state, but crumbled when grasping it.

○ . . . The flame retardant is of firm texture, but there are no lumps and it is in a powder state.

With regard to the obtained expandable polystyrene particles, pre-expandability, expansion moldability, flame retardancy and an average chord length of cells in the molded foam were measured by the following methods and the obtained results were shown in Table 9.

(Pre-Expansion)

40000 g of the obtained expandable polystyrene particles and as top coating agents, 20 g of polyethylene glycol, 48 g of zinc stearate, 16 g of 12-hydroxystearic acid triglyceride (trade name "K-3 Wax 500" manufactured by Kawaken Fine Chemicals Co., Ltd.), 28 g of stearic acid monoglyceride (trade name "RIKEMAL S-100P" manufactured by RIKEN VITAMIN CO., LTD.) and 120 g of fatty triglyceride (trade name "Sunfat GTS-P" manufactured by Taiyo Kagaku Co., Ltd.) were supplied into a tumbler mixer and stirred for 30 minutes, thereby coating the surfaces of the expandable polystyrene particles with the top coating agents.

Next, after the expandable polystyrene particles were stored in a cooling warehouse having 15° C. for 48 hours, 420 g of the expandable polystyrene particles were supplied into a pre-expander equipped with a stirrer and pre-expanded by heating with water vapor, thereby obtaining pre-expanded particles with 40 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

Appearance of the molded foam was visually observed and evaluated according to the following standard.

○ . . . The fused parts between the expanded particles were flat and smooth.

x . . . Concavities and convexities were generated in the fused parts between the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 9 and 10. According to the above JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

◯ . . . Flame-out time is within three seconds and in all of the five specimens, afterglow does not exist, nor does flame spread beyond an indicating line of flammability limit.

◉ . . . Flame-out time is within one second and in all of the five specimens, afterglow does not exist, nor does flame spread beyond an indicating line of flammability limit.

(Average Chord Length)

The average chord length of the molded foam is obtained by measuring according to the test method for ASTM D2842-69. Specifically, the molded foam is cut into substantially two equal parts and the cut surface is photographed at a magnification of 100 times using a scanning Electron Microscope (trade name "S-3000N" manufactured by Hitachi, Ltd.). The photographed image is printed onto A4 paper, at an arbitrary position of which a 60 mm long straight line is drawn. The average chord length (t) of cells is calculated from the number of cells that are present on this straight line by the following formula.

Average chord length $t=60/(\text{number of cells}\times\text{magnification ratio of photograph})$ In drawing a straight line, when the straight line comes into point contact with the cells, these cells are also included in the number of cells as much as possible. Further, when both ends of the straight line are located within the cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

TABLE 9

|  |  |  |  | Example | | | | | |
|---|---|---|---|---|---|---|---|---|---|
|  |  |  |  | 31 | 32 | 33 | 34 | 35 | 36 |
| Impregnation | Flame retardant solution | Type of plasticizer |  | DIBA | DIBA | DIBA | DIBA | DIBA | DBS |
|  |  | Plasticizer | (part by weight) | 100 | 100 | 100 | 100 | 100 | 100 |
|  |  | Flame retardant A | (part by weight) | 89 | 51 | 189 | 89 | 89 | 89 |
|  | Resin particles | Amount of flame retardant A | (part by weight) | 0.7 | 0.4 | 1.5 | 0.7 | 0.7 | 0.7 |
|  |  | Temperature of impregnating with blowing agent | ° C. | 100 | 100 | 100 | 97 | 103 | 100 |
|  |  | Flame retardant aggregates | g | 0 | 0 | 0 | 0 | 0 | 0 |
| Flame retardant A | TBCO |  | (part by weight) | 99.5 | 99.5 | 99.5 | 99.5 | 99.5 | 99.5 |
|  | Silica |  | (part by weight) | 0.5 | 0.5 | 0.5 | 0.5 | 0.5 | 0.5 |
|  | Blocking evaluation of flame retardant A |  |  | ◯ | ◯ | ◯ | ◯ | ◯ | ◯ |
| Evaluation | Flame retardant test | Flame-out time | (sec) | 1.0 | 1.2 | 0.6 | 1.0 | 1.0 | 1.0 |
|  |  | Comprehensive evaluation |  | ◯ | ◯ | ◉ | ◯ | ◯ | ◯ |
|  | Average chord length |  | (μm) | 60 | 70 | 40 | 50 | 60 | 65 |
|  | Appearance evaluation of foam |  |  | ◯ | ◯ | ◯ | ◯ | ◯ | ◯ |

TABLE 10

|  |  |  |  | Comparative Example | | | | | |
|---|---|---|---|---|---|---|---|---|---|
|  |  |  |  | 24 | 25 | 26 | 27 | 28 | 29 |
| Impregnation | Flame retardant solution | Type of plasticizer |  | DIBA | DIBA | DIBA | DIBA | DMP | Liquid paraffin |
|  |  | Plasticizer | (part by weight) | 100 | 100 | 100 | 100 | 100 | 100 |
|  |  | Flame retardant A | (part by weight) | 37 | 377 | 89 | 89 | 89 | 89 |
|  | Resin particles | Amount of flame retardant A | (part by weight) | 0.3 | 3.0 | 0.7 | 0.7 | 0.7 | 0.7 |
|  |  | Temperature of impregnating with blowing agent | ° C. | 100 | 100 | 80 | 120 | 100 | 100 |
|  |  | Flame retardant aggregates | g | 0 | 0 | 0 | 0 | 0 | 0 |
| Flame retardant A | TBCO |  | (part by weight) | 99.5 | 99.5 | 99.5 | 99.5 | 99.5 | 99.5 |
|  | Silica |  | (part by weight) | 0.5 | 0.5 | 0.5 | 0.5 | 0.5 | 0.5 |
|  | Blocking evaluation of flame retardant A |  |  | ◯ | ◯ | ◯ | ◯ | ◯ | ◯ |
| Evaluation | Flame retardant test | Flame-out time | (sec) | Burning | 0.3 | 1.0 | 1.0 | Not evaluated | Not evaluated |
|  |  | Comprehensive evaluation |  | X | ◉ | ◯ | ◯ | Not evaluated | Not evaluated |
|  | Average chord length |  | (μm) | 85 | 35 | 300 | 30 | Not evaluated | Not evaluated |
|  | Appearance evaluation of foam |  |  | ◯ | X | X | X | Not evaluated | Not evaluated |

Example 37

An aqueous suspension was formed by supplying 120 g of tribasic calcium phosphate (manufactured by Taihei Chemical Industrial Co. Ltd.), 2.4 g of sodium dodecylbenzenesulfonate, 160 g of benzoyl peroxide (having a 75% by weight purity), 30 g of t-butylperoxy-2-ethylhexyl monocarbonate, 40 kg of ion-exchange water and 40 kg of styrene monomer to an autoclave having an internal volume of 100 litters equipped with a stirrer and stirring them by rotating stir blades at a stirring speed of 100 rpm.

Next, while stirring the aqueous suspension by rotating the stir blades at a stirring speed of 100 rpm, the temperature inside the autoclave was raised up to 90° C. and maintained at 90° C. for six hours and the temperature inside the autoclave was further raised up to 120° C. and maintained at 120° C. for two hours, thereby carrying out suspension polymerization of the styrene monomer.

After that, the temperature inside the autoclave was cooled down to 25° C. Polystyrene particles were taken out from the inside of the autoclave, repeatedly washed and dehydrated multiple times. After undergoing a drying process, the polystyrene particles were classified, thereby obtaining the polystyrene particles having a diameter of 0.6 to 0.85 mm and a weight average molecular weight of 300,000.

Next, 30 kg of ion-exchange water, 4 g of sodium dodecylbenzenesulfonate and 100 g of magnesium pyrophosphate were supplied to another autoclave having 100 litters equipped with a stirrer, followed by supplying 11 kg of the above polystyrene particles as seed particles into the autoclave and stirring them to be uniformly dispersed in water.

Additionally, while a dispersant was prepared by dispersing 2 g of sodium dodecylbenzenesulfonate and 20 g of magnesium pyrophosphate in 6 kg of ion-exchange water, a styrene monomer solution was prepared by dissolving 132 g of benzoyl peroxide (having a 75% by weight purity) and 50 g of t-butylperoxy-2-ethylhexyl monocarbonate, which are polymerization initiators, in 5 kg of styrene monomer. This styrene monomer solution was added to the above dispersion liquid. The mixture was stirred with a homomixer, and then emulsified, thereby obtaining an emulsion.

After the temperature inside the autoclave was heated to and maintained at 75° C., the above emulsion was added into the autoclave, the temperature was maintained for 30 minutes so as to smoothly absorb the styrene monomer and benzoyl peroxide into the polystyrene seed particles. After that, while the temperature inside the autoclave was raised from 75° C. to 108° C. at a temperature rise rate of 0.2° C. per minute, 28 kg of styrene monomer was continuously dropped into the autoclave for 160 hours. Next, 20 minutes after completing the dropping of the styrene monomer, the temperature was raised up to 120° C. at a temperature rise rate of 1° C. per minute and maintained at the temperature for 90 minutes, and therefore, polystyrene particles were obtained by seed polymerization. In addition, all of the styrene monomer was used in polymerization.

Moreover, a flame retardant A was prepared by adding 2.24 g of silica (trade name "AEROSIL 200" manufactured by AEROSIL Japan Inc.) as a fluidizer to 440 g of a flame retardant of tetrabromocyclooctane (trade name "Pyroguard FR-200" manufactured by DAI-ICHI KOGYO SEIYAKU CO., LTD.) and undergoing dry blending (for example, with a Henschel mixer).

Furthermore, 6 g of sodium dodecylbenzenesulfonate and 112 g of magnesium pyrophosphate obtained by a metathesis method were supplied to 2 kg of ion exchange water and they were stirred. Then, while being heated to and maintained at 50° C., 330 g of toluene as a plasticizer, 480 g of the flame retardant A and 110 g of a flame retardant aid, dicumyl peroxide were added into the above ion exchange water and stirred with a homomixer (T.K. Homomixer, MARKII f model, manufactured by Tokushu Kika Kogyo Kabushiki Kaisha) at 7000 rpm for 30 minutes. Then, the flame retardant A and the flame retardant aid were completely dissolved therein to form a flame-retardant solution, and right after that, this flame-retardant solution was dispersed in the ion exchange water, thereby forming dispersions of the flame-retardant solution.

Next, the temperature inside the autoclave was cooled down to 50° C. at a temperature decrease rate of 1° C. per minute, followed by supplying the above flame-retardant solution into the autoclave.

Then, the autoclave was sealed after 30 minutes had elapsed since the flame-retardant solution was supplied into the autoclave. After that, 3600 g of butane (iso-butane/n-butane (weight ratio)=30/70) was pressed into the autoclave under nitrogen pressure as a blowing agent for 30 minutes and the temperature inside the autoclave was raised up to 112° C. and maintained at the temperature for two and a half hours.

After that, the temperature inside the autoclave was cooled down to 25° C. Expandable polystyrene particles were taken out from the inside of the autoclave, repeatedly washed and dehydrated multiple times. After undergoing a drying process, the flame-retardant expandable polystyrene particles were classified, thereby obtaining thermoplastic expandable polystyrene particles having a particle diameter of 0.9 to 1.4 mm and an average particle diameter of 1.1 mm. It is noted that the flame-retardant solution was entirely impregnated into the polystyrene particles.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 38

Expandable polystyrene particles were obtained as in Example 37 except that the amount of the flame retardant A was 400 g instead of 480 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 39

Expandable polystyrene particles were obtained as in Example 37 except that the amount of the flame retardant A was 750 g instead of 480 g.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Example 40

Expandable polystyrene particles were obtained as in Example 37 except that the temperature of impregnating with the blowing agent was set at 80° C. instead of 112° C.

When a molded foam obtained by filling pre-expanded particles which were pre-expanded by using these expandable polystyrene particles into a mold and letting them expand was prepared, its filling property into a cavity was good. Also, the obtained molded foam had no concavities and convexities observed in fused parts between the expanded particles thereof, so that the flame retardant was uniformly absorbed. Moreover, when the average chord length of the obtained molded foam was measured, cell fineness was not observed because the flame retardant was used in an appropriate amount. Furthermore, the obtained molded foam had good appearance.

Comparative Example 30

Expandable polystyrene particles were obtained as in Example 37 except that the amount of the flame retardant A was 130 g instead of 480 g. Therefore, non-uniform absorption of the flame retardant occurred and concavities and convexities were observed in fused parts between the expanded particles of the molded foam.

Comparative Example 31

Expandable polystyrene particles were obtained as in Example 37 except that the amount of the flame retardant A was 1320 g instead of 480 g. When the average chord length of the obtained molded foam was measured, cell fineness was observed because the flame retardant was used in a large amount. Therefore, concavities and convexities were observed in fused parts between the expanded particles of the molded foam.

Comparative Example 32

Expandable polystyrene particles were obtained as in Example 37 except that the temperature of impregnating with the blowing agent was set at 70° C. instead of 100° C. When the average chord length of the obtained molded foam was measured, it was 160 μm and therefore, concavities and convexities were observed in fused parts between the expanded particles of the molded foam.

(Method for Measuring Average Particle Diameter)

Using a Ro-tap type sieve shaker (manufactured by Iida Seisakusho Co. Ltd.), about 50 to 100 g of specimens were classified for ten minutes with a JIS standard sieve of 4.00 mm sieve aperture, 3.35 mm aperture, 2.80 mm aperture, 2.36 mm aperture, 2.00 mm aperture, 1.70 mm aperture, 1.40 mm aperture, 1.18 mm aperture, 1.00 mm aperture, 0.85 mm aperture, 0.71 mm aperture, 0.60 mm aperture, 0.50 mm aperture, 0.425 mm aperture, 0.355 mm aperture, 0.300 mm aperture, 0.250 mm aperture, 0.212 mm aperture, 0.180 mm aperture and the weights of the specimens on a sieve mesh were measured and from the results, a cumulative weight distribution curve was obtained. The particle diameter whose cumulative weight is 50% (median diameter) based on the cumulative weight distribution curve is called the average particle diameter.

(Method for Measuring Coefficient of Variation (CV Value) of the Diameter of Polystyrene Resin Particles)

A coefficient of variation (CV value) of the diameter of the polystyrene resin particles is the value calculated by substituting a standard deviation (δ) of the particle diameter and an average particle diameter (x) into the following formula.

$$\text{CV value}(\%) = (\delta/x) \times 100$$

(Method for Measuring Silica Specific Surface Area)

All methods for measuring the specific surface area of the silica fine powders used in the present invention are based on the BET method.

(Blocking Evaluation of Flame Retardant A)

Evaluations were made in a way that 100 g of the flame retardant was put in a polyethylene bag, packed into a cylinder having a diameter of 50 mm, on which 1.1 kg of spindle was put, and stored in an oven having 40° C. for one month, followed by taking it out from there to observe the state.

x . . . The flame retardant is hardened in a very hard state, which can not be fully crumbled even when grasping it Δ . . . The flame retardant is hardened in a hard state, but crumbled when grasping it.

○ . . . The flame retardant is of firm texture, but there are no lumps and it is in a powder state.

With regard to the obtained expandable polystyrene particles, pre-expandability, expansion moldability, flame retardancy and an average chord length of the cells in the molded foam were measured by the following methods and the obtained results were shown in Table 11.

(Pre-Expansion)

40000 g of the obtained expandable polystyrene particles and as top coating agents, 20 g of polyethylene glycol, 60 g of zinc stearate, 40 g of 12-hydroxystearic acid triglyceride (trade name "K-3 Wax 500" manufactured by Kawaken Fine Chemicals Co., Ltd.) and 20 g of stearic acid monoglyceride (trade name "RIKEMAL S-100P" manufactured by RIKEN VITAMIN CO., LTD.) were supplied into a tumbler mixer and stirred for 30 minutes, thereby coating the surfaces of the expandable polystyrene particles with the top coating agents.

Next, after the expandable polystyrene particles were stored in a cooling warehouse having 15° C. for 48 hours, 500 g of the expandable polystyrene particles were supplied into a pre-expander equipped with a stirrer and pre-expanded by heating with water vapor, thereby obtaining pre-expanded particles with 50 times in bulkiness.

(Expansion Moldability)

The above polystyrene pre-expanded particles were filled into a mold of an expansion-molding machine (trade name "ACE-3SP" manufactured by Sekisui Machinery Co., Ltd.) and subjected to secondary expansion with water vapor, thereby obtaining a molded foam having a rectangular parallelepiped shape of 300 mm length×400 mm width×30 mm height.

(Appearance Evaluation of Molded Foam)

Appearance of the molded foam was visually observed and evaluated according to the following standard.

○ . . . The fused parts between the expanded particles were flat and smooth.

x . . . Concavities and convexities were generated in the fused parts between the expanded particles.

(Flame Retardant Test)

From the obtained polystyrene molded foam, five test specimens each having a rectangular parallelepiped shape of 200 mm length×25 mm width×10 mm height were cut out by a vertical cutter. After aging them in an oven having 60° C. for one day, measurement was made according to the measuring method A of JIS A9511-2006. By determining the average value of the five test specimens and defining the average value as a flame-out time, comprehensive evaluation was made according to the following criteria. The obtained results were shown as self-extinguishing properties in Tables 11 and 12. According to the above JIS standard, the flame-out time is required to be within three seconds. Therefore, the flame-out time is preferably within two seconds, more preferably within one second.

x . . . Flame-out time exceeds three seconds, or even in one test specimen, afterglow exists or flame spreads beyond an indicating line of flammability limit.

◯ . . . Flame-out time is within three seconds and in all of the five test specimens, afterglow does not exist, nor does flame spread beyond an indicating line of flammability limit.

◉ . . . Flame-out time is within one second and in all of the five test specimens, afterglow does not exist, nor does flame spread beyond an indicating line of flammability limit.

(Average Chord Length)

The average chord length of the molded foam is obtained by measuring according to the test method for ASTM D2842-69. Specifically, the molded foam is cut into substantially two equal parts and the cut surface is photographed at a magnification of 100 times using a scanning Electron Microscope (trade name "S-3000N" manufactured by Hitachi, Ltd.). The photographed image is printed onto A4 paper, at an arbitrary position of which a 60 mm long straight line is drawn. The average chord length (t) of cells is calculated from the number of cells that are present on this straight line by the following formula.

Average chord length $t=60/(\text{number of cells}\times\text{magnification ratio of photograph})$ In drawing a straight line, when the straight line comes into point contact with the cells, these cells are also included in the number of cells as much as possible. Further, when both ends of the straight line are located within the cells without passing through the cells, the cells in which the both ends of the straight line are located are also included in the number of cells. Furthermore, the average chord lengths in five given positions of the photographed image are calculated by the same method as described above and the arithmetic mean value of these average chord lengths is defined as the average chord length of the molded foam.

TABLE 11

| | | | | Example | | | |
|---|---|---|---|---|---|---|---|
| | | | | 37 | 38 | 39 | 40 |
| Impregnation | Flame retardant solution | Plasticizer | (part by weight) | 100 | 100 | 100 | 100 |
| | | Flame retardant A | (part by weight) | 145 | 121 | 227 | 145 |
| | Resin particles | Amount of flame retardant A | (part by weight) | 1.1 | 0.9 | 1.7 | 1.1 |
| | Temperature of impregnating with blowing agent | | ° C. | 112 | 112 | 112 | 80 |
| | Flame retardant aggregates | | g | 0 | 0 | 0 | 0 |
| Flame retardant A | TBCO | | (part by weight) | 99.5 | 99.5 | 99.5 | 99.5 |
| | Silica | | (part by weight) | 0.5 | 0.5 | 0.5 | 0.5 |
| | Blocking evaluation of flame retardant A | | | ◯ | ◯ | ◯ | ◯ |
| Evaluation | Flame retardant test | Flame-out time | (sec) | 0.9 | 1.1 | 0.6 | 1.0 |
| | | Comprehensive evaluation | | ◯ | ◯ | ◉ | ◯ |
| | Average chord length | | (μm) | 50 | 90 | 60 | 80 |
| | Appearance evaluation of foam | | | ◯ | ◯ | ◯ | ◯ |

TABLE 12

| | | | | Comparative Example | | |
|---|---|---|---|---|---|---|
| | | | | 30 | 31 | 32 |
| Impregnation | Flame retardant solution | Plasticizer | (part by weight) | 100 | 100 | 100 |
| | | Flame retardant A | (part by weight) | 39 | 400 | 145 |
| | Resin particles | Amount of flame retardant A | (part by weight) | 0.3 | 3.0 | 1.1 |
| | Temperature of impregnating with blowing agent | | ° C. | 112 | 112 | 70 |
| | Flame retardant aggregates | | g | 0 | 0 | 0 |
| Flame retardant A | TBCO | | (part by weight) | 99.5 | 99.5 | 99.5 |
| | Silica | | (part by weight) | 0.5 | 0.5 | 0.5 |
| | Blocking evaluation of flame retardant A | | | ◯ | ◯ | ◯ |
| Evaluation | Flame retardant test | Flame-out time | (sec) | Burning | 0.3 | 1.2 |
| | | Comprehensive evaluation | | X | ◉ | ◯ |
| | Average chord length | | (μm) | 80 | 15 | 160 |
| | Appearance evaluation of foam | | | X | X | X |

INDUSTRIAL APPLICABILITY

Because of suitable workability and heat-insulating property, the present invention is available for a heat reserving material for plumbing, a heat insulating material for roofs, a member for automobiles, a heat reserving material for solar system and the like. In particular, polystyrene molded foams used in a heat reserving material for a hot-water storage tank of a water heater are used as expandable polystyrene resin particles in order to promote high efficiency of equipments by reducing a heat radiation loss from the hot-water storage tank and achieve a certain criterion of heat-insulating property and further flame retardant property.

Especially, the present invention is excellent in expandability and the expandable polystyrene resin particles for a heat-insulating material used for a roof insulating material is available, for example, for a heat-insulating material for a roof insulating material placed between a base material such as a roofing board or the like and a roofing material. Furthermore, the present invention can be applied to expandable polystyrene resin particles for a heat-insulating material used under the floor of a house and underfloor heat-insulating materials for housing. More specifically, the present invention can be applied to underfloor heat-insulating materials for housing, which are used by disposing it between floor joists, sleepers or the like in the floor of a building, between pillars or intermediate pillars in a wall, between rafters in a roof and the like. Furthermore, the present invention is excellent in expandability and available for expandable polystyrene resin particles having excellent flame retardancy and heat-insulating property, which are used for a heat-insulating material for a hot water storage tank of a heat pump type water heater and heat-insulating materials for a hot water tank of a heat pump type water heater. Furthermore, the present invention is excellent in environmental compatibility and flame retardancy, and further available for expandable polystyrene resin particles for a heat-insulating material which are preferably used for interior materials for vehicles containing a small amount of the flame retardant that is an organic additive, particularly, a floor spacer, a door pad, a tool box or the like, and interior materials for vehicles. Furthermore, the present invention is excellent in expandability and available for expandable polystyrene resin particles having excellent flame retardancy which are used for embankment materials and a embankment member.

What is claimed is:

1. Expandable polystyrene resin particles, which are obtained by supplying a flame-retardant solution into an aqueous suspension before or during impregnating polystyrene resin particles dispersed in the aqueous suspension with a blowing agent, in which the flame-retardant solution is prepared by dissolving in a liquid state plasticizer 33 to 1000 parts by weight of powdery flame retardant relative to 100 parts by weight of the plasticizer and further 20 to 200 parts by weight of a flame retardant aid having one-hour half-life temperature of 100° C. to 250° C. relative to 100 parts by weight of the plasticizer, and
impregnating the polystyrene resin particles with the flame retardant and the flame retardant aid,
wherein the flame retardant comprises tetrabromocyclooctane that is dry blended with silica fine powders with a Henschel mixer and preliminarily dispersed by silica fine powders,
the silica fine powders have the specific surface area of 170 to 330 m²/g,
the silica fine powders are contained in an amount of 0.3 to 1.5 parts by weight relative to 98.5 to 99.7 parts by weight of the tetrabromocyclooctane, and
the flame retardant is absorbed into the central portion of the polystyrene resin particles and the silica fine powders are not absorbed into the polystyrene resin particles.

2. The expandable polystyrene resin particles according to claim 1, wherein the flame-retardant solution is dispersed in 100 to 3000 parts by weight of aqueous medium relative to 100 parts by weight of the plasticizer and 0.005 to 10 parts by weight of surfactant is contained in the aqueous medium.

3. The expandable polystyrene resin particles according to claim 2, wherein a poor water-soluble inorganic salt is contained in the aqueous medium.

4. A method for preparing expandable polystyrene resin particles comprising the following steps of:
supplying a flame-retardant solution to an aqueous suspension before or during impregnating polystyrene resin particles dispersed in the aqueous suspension with a blowing agent, in which the flame-retardant solution is prepared by dissolving in a liquid state plasticizer 33 to 1000 parts by weight of powdery flame retardant relative to 100 parts by weight of the plasticizer and further 20 to 200 parts by weight of a flame retardant aid having one-hour half-life temperature of 100° C. to 250° C. relative to 100 parts by weight of the plasticizer and
impregnating the above polystyrene resin particles with the flame retardant and the flame retardant aid,
wherein the flame retardant comprises tetrabromocyclooctane that is dry blended with silica fine powders with a Henschel mixer and preliminarily dispersed by silica fine powders,
the silica fine powders have the specific surface area of 170 to 330 m²/g, and
the silica fine powders are contained in an amount of 0.3 to 1.5 parts by weight relative to 98.5 to 99.7 parts by weight of the tetrabromocyclooctane, and
wherein the flame retardant is absorbed into the central portion of the polystyrene resin particles and the silica line powders are not absorbed into the polystyrene resin particles.

5. Pre-expanded particles which are prepared by pre-expanding the expandable polystyrene resin particles as set forth in claim 1.

6. A heat-insulating material for a root insulating material, which is a molded foam obtained by filling the pre-expanded particles as set forth in claim 5 into a mold and letting them expand whose average chord length is 30 to 380 μm.

7. A heat-insulating material for a roof insulating material, which is a polystyrene molded foam obtained by filling the pre-expanded particles as set forth in claim 5 into a mold and letting them expand, wherein the density of the polystyrene molded foam is 0.018 to 0.033 g/cm³,
the average chord length of the molded foam is 30 to 380 μm and
the polystyrene molded foam is made from polystyrene resin particles having an average particle diameter of 0.3 mm to 1.2 mm.

8. An underfloor heat-insulating material for housing, which is a molded foam obtained by filling the pre-expanded particles as set firth in claim 5 into a mold and letting them expand whose average chord length is 20 to 150 μm.

9. An underfloor heat-insulating, material for housing, which is the underfloor heat-insulating material for housing as set forth in claim 8, wherein the molded foam comprises one or more kinds of aromatic organic compounds selected from a group consisting of styrene monomer(s), ethyl benzene, isopropyl benzene, normal propyl benzene, xylene and toluene, and wherein the total amount of the one or more kinds of aromatic organic compounds is less than 1000 ppm relative to the total amount of the polystyrene foam.

10. An underfloor heat-insulating material for housing, which is a polystyrene molded foam obtained by filling the pre-expanded particles as set forth in claim 5 into a mold and letting them expand, wherein the density of the polystyrene molded foam is 0.020 to 0.028 g/cm³ and the polystyrene molded foam is made from polystyrene resin particles having an average particle diameter 0.3 mm to 1.2 mm.

11. A heat-insulating material for a hot-water storage tank of a heat pump type water heater, which is a molded foam obtained by filling the pre-expanded particles as set forth in claim 5 into a mold and letting them expand whose average chord length is 50 to 350 μm.

12. A heat-insulating material for a hot-water storage tank of a heat pump type water beater, which is a polystyrene molded foam obtained by filling the pre-expanded particles set forth in claim 5 and letting them expand, wherein the density of the polystyrene molded foam is 0.016 to 0.033 g/cm³, the average chord length of the molded foam is 50 to 350 μm and the polystyrene molded foam is made from polystyrene resin particles having an average particle diameter of 0.3 mm to 1.2 mm.

13. A heat-insulating material for a car interior material, which is a molded foam obtained by filling the pre-expanded particles as set forth in claim 5 and letting them expand whose average chord length is 40 to 150 μm.

14. An interior material for automobile, which is the heat-insulating material for car interior material as set forth in claim 13, wherein the molded foam comprises one or more kinds of aromatic organic compounds selected from a group consisting of styrene monomer(s), ethyl benzene, isopropyl benzene, normal propyl benzene, xylene and toluene, and wherein the total amount of the one or more kinds of aromatic organic compounds is less than 1000 ppm relative to the total amount of the polystyrene molded foam.

15. An interior material for automobile, which is a polystyrene molded foam Obtained by filling the pre-expanded particles as set forth in claim 13 into it mold and letting them expand, wherein the density of the polystyrene molded foam is 0.016 to 0.066 g/cm³, the average chord length of the molded foam is 40 to 150 μm and the polystyrene molded foam is made from polystyrene resin particles having an average particle diameter of 0.6 mm to 1.2 mm.

16. A member for embankment, which is a molded foam obtained by filling the pre-expanded particles as set forth in claim 5 into a mold and letting them expand whose average chord length of the molded foam is 40 to 120 μm.

17. A member for embankment, which is a polystyrene molded foam obtained by filling the pre-expanded particles as set forth in claim 5 into a mold and letting them expand, wherein the density of the polystyrene molded foam is 0.01 to 0.033 g/cm³, the average chord length of the molded foam is 40 to 120 μm and the polystyrene molded foam is made from polystyrene resin particles having an average particle diameter of 0.6 mm to 1.4 mm.

* * * * *